United States Patent
Carrasco Hernández et al.

(10) Patent No.: US 12,347,996 B2
(45) Date of Patent: Jul. 1, 2025

(54) METHOD FOR ALIGNMENT OF A LASER BEAM EMITTED FROM AN OPTICAL COMMUNICATION TRANSMITTER WITH A RECEIVING STATION

(71) Applicants: UNIVERSIDAD MIGUEL HERNÁNDEZ DE ELCHE, Alicante (ES); EMBEDDED INSTRUMENTS AND SYSTEMS S.L., Alicante (ES)

(72) Inventors: José Antonio Carrasco Hernández, Alicante (ES); Francisco Javier García De Quirós Nieto, Alicante (ES); Ignacio Moreno Soriano, Alicante (ES)

(73) Assignees: UNIVERSIDAD MIGUEL HERNÁNDEZ DE ELCHE, Alicante (ES); EMBEDDED INSTRUMENTS & SYSTEMS, S.L., Alicante (ES)

( * ) Notice: Subject to any disclaimer, the term of this patent is extended or adjusted under 35 U.S.C. 154(b) by 441 days.

(21) Appl. No.: 17/999,064

(22) PCT Filed: May 18, 2021

(86) PCT No.: PCT/EP2021/063069
§ 371 (c)(1),
(2) Date: Nov. 17, 2022

(87) PCT Pub. No.: WO2021/233870
PCT Pub. Date: Nov. 25, 2021

(65) Prior Publication Data
US 2023/0223733 A1    Jul. 13, 2023

(30) Foreign Application Priority Data
May 19, 2020  (EP) ..................... 20382426

(51) Int. Cl.
*H04B 10/00*      (2013.01)
*G02B 5/32*       (2006.01)
(Continued)

(52) U.S. Cl.
CPC ............... *H01S 3/101* (2013.01); *G02B 5/32* (2013.01); *G02B 26/0808* (2013.01);
(Continued)

(58) Field of Classification Search
CPC ......... H01S 3/101; H01S 3/1686; G02B 5/32; G02B 26/0808; G02B 26/0833; H04B 7/18513; H04B 10/118; G02F 1/292
See application file for complete search history.

(56) References Cited

U.S. PATENT DOCUMENTS 5,475,520 A      12/1995   Wissinger
6,271,953 B1 *    8/2001   Dishman ............... H04B 10/118
                                                         398/91

(Continued)

FOREIGN PATENT DOCUMENTS

JP      2018530976 A    10/2018
WO      WO2016/022579 A1   2/2016

OTHER PUBLICATIONS

International Search Report for PCT/EP2021/063069. Mailed Aug. 3, 2021. 16 pages.
(Continued)

*Primary Examiner* — Agustin Bello
(74) *Attorney, Agent, or Firm* — Casimir Jones, S.C.; Tristan A. Fuierer

(57) ABSTRACT

The present invention relates to a method, system and device for transmitting information from an optical communication transmitter to a receiving station via a laser beam and for alignment of said laser beam emitted from said optical communication transmitter with said receiving station, wherein:

(Continued)

said optical communication transmitter is displaced relative to said receiving station and comprises a laser, a radio receiver, a microprocessor and a liquid crystal on silicon spatial light modulator comprising a diffractive element, whereby said laser beam is emitted from said laser and is projected over an area by diffraction and reflection using said liquid crystal on silicon spatial light modulator, wherein said laser and said diffractive element are controlled by said microprocessor, wherein said laser beam has a longitudinal axis parallel to the propagation path of said laser beam, said receiving station comprises a photodiode receiver for detecting said transmitted laser beam and a radio transmitter, and said method comprises using a pointing diffraction mask and a tracking diffraction mask, wherein each pointing diffraction mask is generated in combination with a tracking diffraction mask in said diffractive element.

8 Claims, 10 Drawing Sheets

(51) Int. Cl.
 G02B 26/08 (2006.01)
 H01S 3/101 (2006.01)
 H01S 3/16 (2006.01)
 H04B 7/185 (2006.01)

(52) U.S. Cl.
 CPC ........ *G02B 26/0833* (2013.01); *H01S 3/1686* (2013.01); *H04B 7/18513* (2013.01)

(56) References Cited

U.S. PATENT DOCUMENTS

| | | | | |
|---|---|---|---|---|
| 7,257,418 | B1* | 8/2007 | Chang | H04B 7/18545 455/12.1 |
| 9,971,095 | B2* | 5/2018 | Kim | H04B 10/1125 |
| 10,277,321 | B1* | 4/2019 | Carlson | H04B 10/69 |
| 10,637,572 | B1* | 4/2020 | Carlson | H04J 14/0228 |
| 10,917,173 | B2* | 2/2021 | Kingsbury | H04B 7/18513 |
| 11,848,701 | B2* | 12/2023 | Imai | H04B 10/114 |
| 2006/0024061 | A1* | 2/2006 | Wirth | H04B 10/1125 398/129 |
| 2007/0031150 | A1* | 2/2007 | Fisher | H04B 10/118 398/128 |
| 2008/0056723 | A1 | 3/2008 | Giles et al. | |
| 2009/0010644 | A1* | 1/2009 | Varshneya | G01S 7/484 398/33 |
| 2009/0078850 | A1* | 3/2009 | Pinto | G02B 26/0841 359/849 |
| 2012/0249366 | A1* | 10/2012 | Pozgay | H04B 7/18571 342/354 |
| 2013/0179008 | A1* | 7/2013 | DeVaul | H04B 7/18504 701/3 |
| 2014/0376914 | A1* | 12/2014 | Miniscalco | H04B 10/1129 398/58 |
| 2016/0043800 | A1* | 2/2016 | Kingsbury | H04B 7/18513 398/125 |
| 2016/0204866 | A1* | 7/2016 | Boroson | H04B 10/29 398/97 |
| 2017/0141849 | A1* | 5/2017 | Thangavelautham | H04B 10/118 |
| 2017/0346563 | A1* | 11/2017 | Steinkraus | H04B 10/118 |
| 2019/0157757 | A1* | 5/2019 | Murakowski | H04B 10/548 |
| 2020/0371736 | A1* | 11/2020 | Iversen | G06F 3/1446 |
| 2020/0389232 | A1* | 12/2020 | Danesh | H04B 10/112 |
| 2021/0067246 | A1* | 3/2021 | Nykolak | H04B 10/1125 |
| 2021/0067248 | A1* | 3/2021 | Nykolak | H04B 10/118 |
| 2021/0109343 | A1* | 4/2021 | Gao | G02B 26/0833 |
| 2023/0084166 | A1* | 3/2023 | Searcy | H04B 10/118 343/702 |
| 2023/0223733 | A1* | 7/2023 | Carrascoso | H01S 3/1686 359/298 |

OTHER PUBLICATIONS

Miller. (G3RUH) 9600 Band Packet Radio Modem Design. AMSAT. 1995. 10 pages.

Moreno et al., Spatial Light Modulators as active optical elements for laser space communications. Workshop on Active Optics. 2018. 43 pages.

Silvia-Lopez et al., Validation of a spatial light modulator for space applications. International Conference on Space Optics—ICSO 2018. 8 pages.

* cited by examiner

A (a) (b) (c) (d) (e)

B (a) (b) (c) (d) (e)

A

B (a)          (b)          (c)

Figure 7 contd.
B
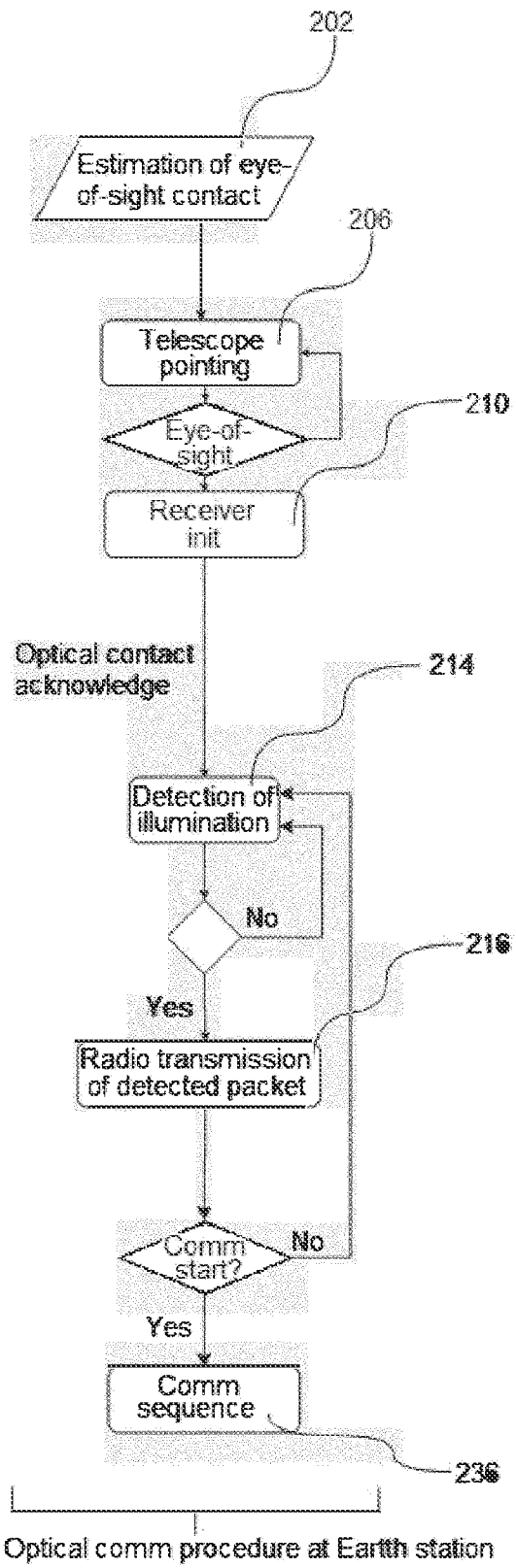
Optical comm procedure at Earth station

A.

B.

(a) (b) (c) (d) (e)

METHOD FOR ALIGNMENT OF A LASER BEAM EMITTED FROM AN OPTICAL COMMUNICATION TRANSMITTER WITH A RECEIVING STATION

CROSS-REFERENCE TO RELATED APPLICATIONS

This application is filed under the provisions of 35 U.S.C. § 371 and claims the priority of International Patent Application No. PCT/EP2021/063069, filed on 18 May 2021 entitled "METHOD FOR ALIGNMENT OF A LASER BEAM EMITTED FROM AN OPTICAL COMMUNICATION TRANSMITTER WITH A RECEIVING STATION" in the name of José Antonio CARRASCOSO HERNÁNDEZ, et al., which claims priority to European Patent Application No. 20382426.3 filed on 19 May 2020, both of which are hereby incorporated by reference herein in their entirety.

FIELD OF THE INVENTION

The present invention belongs to the technical field of optical communication, more particularly, satellite communication using optical signals.

BACKGROUND TO THE INVENTION

Optical communication systems in the free space are recently gaining much attention worldwide given that the technological advances allow its practical implementation in commercial applications such as spacecraft, replacing the more typical radiofrequency links particularly between mobile stations. However, Optical communication systems present the additional problem of the pointing and tracking between transmitter and receiver.

The pointing and tracking, with the transmitter, receiver or both, in movement, must be typically implemented with fine excursions from 3 to 6 degrees and laser beam errors below 0.02 degrees. This was initially achieved with servomotor-controlled, propulsor mechanical implementations or microelectromechanical systems (MEMS) micro-mirrors (see WO2016022579 A1), which add complexity, weight and bulkiness to optical communications systems, particularly small platforms of from 3 to 50 kg, in addition to which use of mechanical implementations is not suitable for long missions due to fuel and energy restrictions as well as wear resulting in increased need for maintenance and reduced reliability over time.

It is also possible to perform the pointing of a small satellite with a solidary laser beam and acting only on the satellite positioning control using star sensors for the accurate measurement of the satellite's three-dimensional (3D) position. Alternatively, pointing can be achieved by changing the refractive index of a liquid crystal through which the projected laser beam travels. Both methods are, however, complex and in the case of the latter require additional optics to control beam deflection.

Thus, it is the problem of the present invention to provide a method, system and device for transmitting information from an optical communication transmitter to a receiving station via a laser beam and for alignment of said laser beam emitted from said optical communication transmitter with said receiving station, wherein said optical communication transmitter has minimal mechanical complexity, reduced weight, minimal wear, low maintenance and/or increased reliability.

BRIEF DESCRIPTION OF THE INVENTION

The present invention relates to a method for transmitting information from an optical communication transmitter (100) to a receiving station (110) via a laser beam (18) and for alignment of said laser beam emitted from said optical communication transmitter with said receiving station, characterised in that:

said optical communication transmitter is displaced relative to said receiving station and comprises a laser (16), a radio receiver (32), a microprocessor (14) and a liquid crystal on silicon spatial light modulator (24) comprising a diffractive element, whereby said laser beam is emitted from said laser and is projected over an area by diffraction and reflection using said liquid crystal on silicon spatial light modulator, wherein said laser and said diffractive element are controlled by said microprocessor, wherein said laser beam has a longitudinal axis parallel to the propagation path of said laser beam, said receiving station comprises a photodiode receiver (52) for detecting said transmitted laser beam and a radio transmitter (60), and said method comprises the following steps:

(i) projecting said laser beam in consecutive intervals over an area in which said receiving station is located by diffraction and reflection using said spatial light modulator;

(ii) dividing said projected laser beam into quadrants intersecting at the longitudinal axis of said projected laser beam;

(iii) interrupting the projection of each quadrant of said laser beam during each interval of a set of consecutive intervals by pulsation of said laser beam using amplitude modulation and by distortion of the wavefront of said laser beam using a pointing diffraction mask generated in said diffractive element for each interval of said set. wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency of the pulses of said amplitude-modulated laser beam that are emitted during any given interval are the same for all quadrants over which said laser beam is projected, and wherein the frequency of the pulses of said amplitude-modulated laser beam that are emitted during at least one interval of said set of intervals are different from the frequency of the pulses of said amplitude-modulated laser beam that are emitted during at least one other interval of said set of intervals;

(iv) identifying the quadrant of said projected laser beam which is detected in said photodiode receiver in the receiving station by determining the frequency of the pulses of the subset of the set of intervals over which the quadrant of said laser beam is projected, and communicating this information to said optical communication transmitter via said radio transmitter and said radio receiver;

(v) projecting said laser beam in consecutive intervals over the area which the quadrant of the laser beam identified in step (iv) was projected over by distorting the wavefront of the laser beam emitted from the laser using the pointing diffraction mask generated in said diffractive element which exclusively projected said quadrant of the laser beam in step (iii); and (vi) repeating steps (ii) to (v) at least a further three times or until the angle between the longitudinal axis of said laser beam projected in step (v) and said longitudinal axis of said projected laser beam in step (ii) is less than π/9500 radians, wherein the direction in which the longitudinal axis of said projected laser beam is pointed in steps (i) to (v) is changed every t seconds as a function of the displacement of the optical communication transmitter with respect to the receiving station by distorting the wavefront of the laser beam emitted from the laser using a tracking diffraction mask which is generated in said diffractive element, wherein the intervals have a frequency of value r of between 10 and 500 Hz, the pulses have a frequency of value f of between 0.1 kHz and 100 MHz, and t is between 0.001 and 10 seconds, wherein each tracking diffraction mask is used:
(a) alone in step (i) and in the first iteration of step (ii): and
(b) in combination with a pointing diffraction mask in steps (iii) to (v) and in subsequent iterations of step (ii).

The present invention also relates to a system for transmitting information from an optical communication transmitter (100) to a receiving station (110) via a laser beam (18) and for alignment of said laser beam emitted from said optical communication transmitter with said receiving station, characterised in that:

said optical communication transmitter is displaced relative to said receiving station and comprises a laser (16), a radio receiver (32), a microprocessor (14) and a liquid crystal on silicon spatial light modulator (24) comprising a diffractive element, whereby said laser beam is emitted from said laser and is projected over an area by diffraction and reflection using said liquid crystal on silicon spatial light modulator, wherein said laser and said diffractive element are controlled by said microprocessor, wherein said laser beam has a longitudinal axis parallel to the propagation path of said laser beam, said receiving station comprises a photodiode receiver (52) for detecting said transmitted laser beam and a radio transmitter (60), and said system comprises means for carrying out the following steps:
(i) projecting said laser beam in consecutive intervals over an area in which said receiving station is located by diffraction and reflection using said spatial light modulator;
(ii) dividing said projected laser beam into quadrants intersecting at the longitudinal axis of said projected laser beam;
(iii) interrupting the projection of each quadrant of said laser beam during each interval of a set of consecutive intervals by pulsation of said laser beam using amplitude modulation and by distortion of the wavefront of said laser beam using a pointing diffraction mask generated in said diffractive element for each interval of said set, wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency of the pulses of said amplitude-modulated laser beam that are emitted during any given interval are the same for all quadrants over which said laser beam is projected, and wherein the frequency of the pulses of said amplitude-modulated laser beam that are emitted during at least one interval of said set of intervals are different from the frequency of the pulses of said amplitude-modulated laser beam that are emitted during at least one other interval of said set of intervals;
(iv) identifying the quadrant of said projected laser beam which is detected in said photodiode receiver in the receiving station by determining the frequency of the pulses of the subset of the set of intervals over which the quadrant of said laser beam is projected, and communicating this information to said optical communication transmitter via said radio transmitter and said radio receiver;
(v) projecting said laser beam in consecutive intervals over the area which the quadrant of the laser beam identified in step (iv) was projected over by distorting the wavefront of the laser beam emitted from the laser using the pointing diffraction mask generated in said diffractive element which exclusively projected said quadrant of the laser beam in step (iii); and
(vi) repeating steps (ii) to (v) at least a further three times or until the angle between the longitudinal axis of said laser beam projected in step (v) and said longitudinal axis of said projected laser beam in step (ii) is less than π/9500 radians wherein the direction in which the longitudinal axis of said projected laser beam is pointed in steps (i) to
(vi) is changed every 1 seconds as a function of the displacement of the optical communication transmitter with respect to the receiving station by distorting the wavefront of the laser beam emitted from the laser using a tracking diffraction mask which is generated in said diffractive element, wherein the intervals have a frequency of value r of between 10 and 500 Hz, the pulses have a frequency of value f of between 0.1 kHz and 100 MHz, and t is between 0.001 and 10 seconds, wherein each tracking diffraction mask is used:
(a) alone in step (i) and in the first iteration of step (ii); and
(b) in combination with a pointing diffraction mask in steps (iii) to (v) and in subsequent iterations of step (ii).

In addition, the present invention relates to an optical communication device for transmitting information from an optical communication transmitter (100) to a receiving station (110) via a laser beam (18) and for alignment of said laser beam emitted from said optical communication transmitter with said receiving station, characterised in that said device comprises the following components:
a laser (16),
a radio receiver (32),
a liquid crystal on silicon spatial light modulator (24) comprising a diffractive element, and
a microprocessor (14),
wherein said laser and said diffractive element are controlled by said microprocessor, characterised in that said components are arranged to carry out the following steps:
(i) projecting said laser beam in consecutive intervals over an area in which said receiving station is located by diffraction and reflection using said spatial light modulator;
(ii) dividing said projected laser beam into quadrants intersecting at the longitudinal axis of said projected laser beam;
(iii) interrupting the projection of each quadrant of said laser beam during each interval of a set of consecutive intervals by pulsation of said laser beam using amplitude modulation and by distortion of the wavefront of said laser beam using a pointing diffraction mask generated in said diffractive element for each interval of said set, wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency of the pulses of said amplitude-modulated laser beam that are emitted during any given interval are the same for all quadrants over which said laser beam is projected, and wherein the frequency of the pulses of said amplitude-modulated laser beam that are emitted during at least one interval of said set of intervals are different from the frequency of the pulses of said amplitude-modulated laser beam that are emitted during at least one other interval of said set of intervals;

(iv) identifying the quadrant of said projected laser beam which is detected in said photodiode receiver in the receiving station by determining the frequency of the pulses of the subset of the set of intervals over which the quadrant of said laser beam is projected, and communicating this information to said optical communication transmitter via said radio transmitter and said radio receiver;

(v) projecting said laser beam in consecutive intervals over the area which the quadrant of the laser beam identified in step (iv) was projected over by distorting the wavefront of the laser beam emitted from the laser using the pointing diffraction mask generated in said diffractive element which exclusively projected said quadrant of the laser beam in step (iii); and (vi) repeating steps (ii) to (v) at least a further three times or until the angle between the longitudinal axis of said laser beam projected in step (v) and said longitudinal axis of said projected laser beam in step (ii) is less than π/9500 radians, wherein the direction in which the longitudinal axis of said projected laser beam is pointed in steps (i) to (v) is changed every t seconds as a function of the displacement of the optical communication transmitter with respect to the receiving station by distorting the wavefront of the laser beam emitted from the laser using a tracking diffraction mask which is generated in said diffractive element, wherein the intervals have a frequency of value r of between 10 and 500 Hz, the pulses have a frequency of value f of between 0.1 kHz and 100 MHz, and t is between 0.001 and 10 seconds, wherein each tracking diffraction mask is used:
(a) alone in step ( ) and in the first iteration of step (ii); and
(b) in combination with a pointing diffraction mask in steps (iii) to (v) and in subsequent iterations of step (i).

Furthermore, the present invention relates to an optical communication transmitter (100) comprising the device herein described.

Moreover, the present invention relates to use of a method, system, optical communication device or optical communication transmitter herein described for:

alignment of the laser beam emitted from said optical communication transmitter with a receiving station; and/or transmitting information from said optical communication transmitter to a receiving station.

Additionally, the present invention relates to a method for transmitting information from a satellite (100) to a receiving station (110) via a laser beam (18) and for alignment of said laser beam emitted from said satellite with said receiving station, characterised in that:

said satellite is displaced relative to said receiving station and comprises a laser (16). a radio receiver (32), a microprocessor (14) and a liquid crystal on silicon spatial light modulator (24) comprising a diffractive element, whereby said laser beam is emitted from said laser and is projected over an area by diffraction and reflection using said liquid crystal on silicon spatial light modulator, wherein said laser and said diffractive element are controlled by said microprocessor, wherein said laser beam has a longitudinal axis parallel to the propagation path of said laser beam, said receiving station comprises a photodiode receiver (52) for detecting said transmitted laser beam and a radio transmitter (60), and said method comprises the following steps:

(i) projecting said laser beam in consecutive intervals over an area in which said receiving station is located by diffraction and reflection using said spatial light modulator:

(ii) dividing said projected laser beam into quadrants intersecting at the longitudinal axis of said projected laser beam;

(iii) interrupting the projection of each quadrant of said laser beam during each interval of a set of consecutive intervals by pulsation of said laser beam using amplitude modulation and by distortion of the wavefront of said laser beam using a pointing diffraction mask generated in said diffractive element for each interval of said set, wherein any given quadrant of said projected laser beam is projected over a subset of said set of intervals which is different from the subset of said set of intervals over which other quadrants of said laser beam are projected and wherein said quadrant is exclusively projected over each interval of said subset, wherein the frequency and/or duration of the pulses of said amplitude-modulated laser beam that are emitted during any given interval are the same for all quadrants over which said laser beam is projected, and wherein the frequency and/or duration of the pulses of said amplitude-modulated laser beam that are emitted during at least one interval of said set of intervals are different from the frequency and/or duration of the pulses of said amplitude-modulated laser beam that are emitted during at least one other interval of said set of intervals;

(iv) identifying the quadrant of said projected laser beam which is detected in said photodiode receiver in the receiving station by determining the frequency and/or duration of the pulses of the subset of the set of intervals over which the quadrant of said laser beam is projected, and communicating this information to said satellite via said radio transmitter and said radio receiver;

(v) projecting said laser beam in consecutive intervals over the area which the quadrant of the laser beam identified in step (iv) was projected over by distorting the wavefront of the laser beam emitted from the laser using the pointing diffraction mask generated in said diffractive element which exclusively projected said quadrant of the laser beam in step (iii); and (vi) repeating steps (ii) to (v) at least a further three times or until the angle between the longitudinal axis of said laser beam projected in step (v) and said longitudinal axis of said projected laser beam in step (ii) is less than π/9500 radians, wherein the receiving station is displaced relative to said satellite, the displacement of the receiving station relative to said satellite being a component of the vector representing the movement of the satellite relative to said receiving station, wherein said component is in the plane perpendicular to a line between said receiving station and said satellite, and wherein the direction in which the longitudinal axis of said projected laser beam is pointed in steps (i) to (v) is changed every t seconds by distorting the wavefront of the laser beam emitted from the laser using a tracking diffraction mask which is generated in said diffractive element, wherein each tracking diffraction mask is used:
(a) alone in step (i) and in the first iteration of step (ii); and
(b) in combination with a pointing diffraction mask in steps (iii) to (v) and in subsequent iterations of step (ii), wherein each tracking diffraction mask is comprised in a holographic greyscale pattern which projects the projected laser beam over the area which it was projected using the tracking diffraction mask used immediately prior thereto, while each combination of tracking diffraction mask and pointing diffraction mask is comprised in a holographic greyscale pattern which projects the projected laser beam either:
(a) over the area which it was projected using the combination of tracking diffraction mask and pointing diffraction mask used immediately prior thereto, when the pointing diffraction masks used in each combination are the same: or
(b) over a subset of the area over which it was projected using:
  (i) the tracking diffraction mask used prior thereto when said combination is the first combination used after using a tracking mask; or
  (ii) the combination of tracking diffraction mask and pointing diffraction mask used prior thereto when the pointing diffraction masks used in each combination are different, and wherein the intervals have a frequency of value r of between 10 and 500 Hz and a duration of less than or equal to $r^{-1}$. the pulses have a frequency of value f of between 0.1 kHz and 100 MHz and a duration of less than or equal to $f^{-1}$, and t is between 0.001 and 10 seconds.

DESCRIPTION OF THE FIGURES

Several aspects and embodiments of the invention are described, by way of example only, with reference to the following figures.

DETAILED DESCRIPTION OF THE INVENTION

The present invention relates to a pointing and tracking method, system and device for free-space optical communication based on an electrically controllable spatial light modulator. In addition, the present invention relates to an optical communication transmitter comprising said device as well as use of said method, system, device or optical communication transmitter for:
  alignment of the laser beam emitted from said optical communication transmitter with a receiving station; and/or
  transmitting information from said optical communication transmitter to a receiving station.

Preferably, said free-space optical communication is between spacecraft or between a spacecraft and a base station (e.g. Earth station), more preferably said free-space optical communication is between a satellite as an optical communication transmitter (100) and an Earth (terrestrial) station as receiving station (110).

Figure 2:
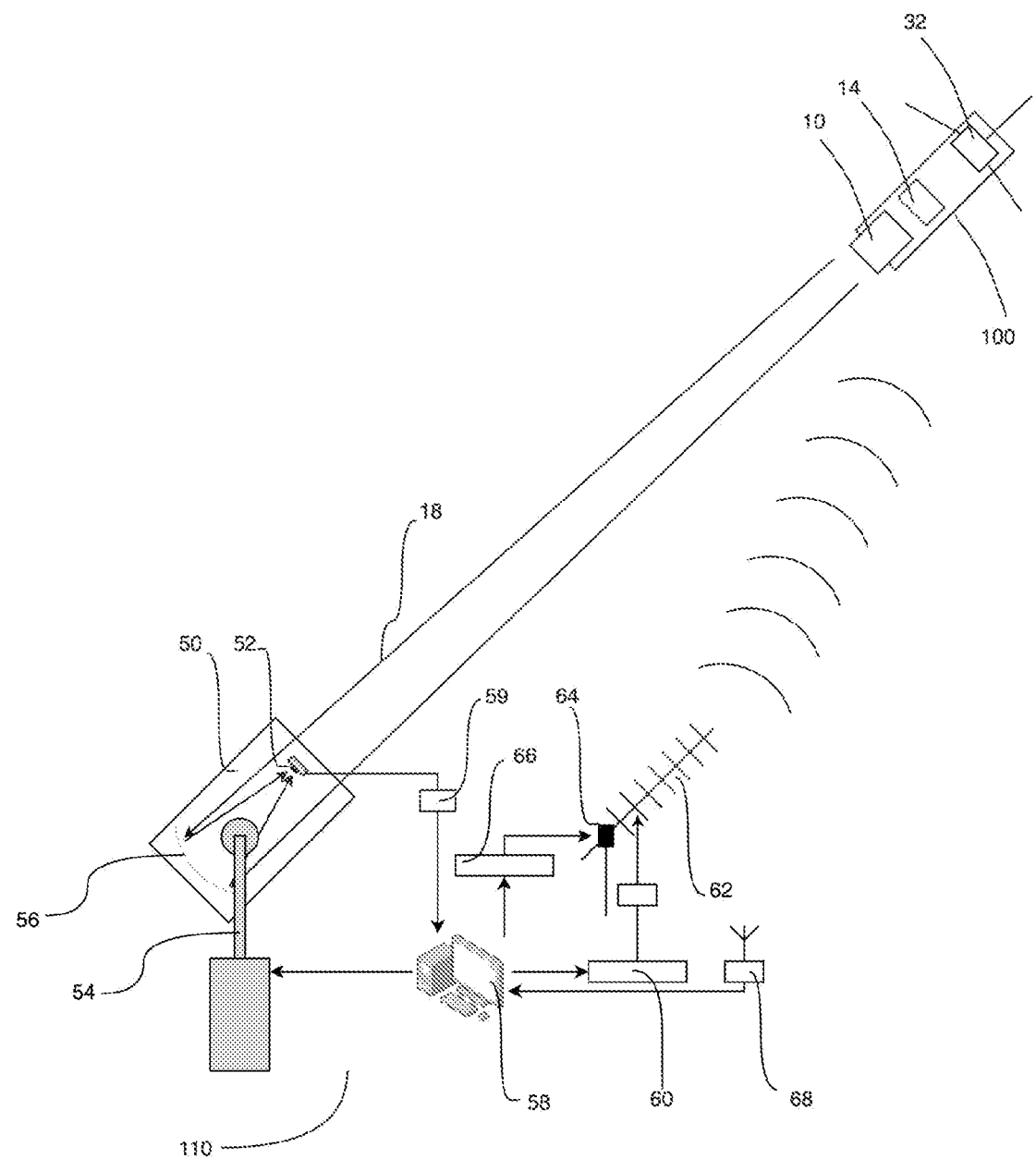
FIG. 2. A receiver system from a receiving station that forms part of an optical communications transmitter system according to one embodiment of the invention.

The present invention relates to a method, system and device for transmitting information from an optical communication transmitter (100) to a receiving station (110) via a laser beam (18) (once diffracted and reflected by the liquid crystal on silicon spatial light modulator, FIG. 2) and for alignment of said laser beam emitted from said optical communication transmitter with said receiving station. Said optical communication transmitter is displaced relative to said receiving station (or vice versa, said receiving station is displaced relative to said optical communication transmitter, i.e. the optical communication transmitter is remote from said receiving station and is moving relative thereto) and transmits information thereto via said laser beam. Preferably, the displacement of the receiving station relative to said optical communication transmitter is a component of the vector representing the movement of the optical communication transmitter relative to said receiving station, wherein said component is in the plane perpendicular to a line between said receiving station and said optical communication transmitter. Thus, said laser beam provides a communication link between the optical communication transmitter and receiving station. In order to maximise the communication link efficiency, it is necessary that the laser beam projected from the optical communication transmitter is aligned as closely as possible with said receiving station (i.e. the laser beam is projected over an area in which said receiving station is located) so that the available light cast by the laser beam is concentrated over as small an area as possible. The method, system and device thus focus the projected laser beam over an area in which said receiving station is located, so as to approximate station-finding through pointing and tracking. Thus, the present invention relates to a method, system and device for tracking a receiving station as it is displaced relative to an optical communication transmitter, and pointing said optical communication transmitter (in particular, pointing the longitudinal axis of the propagation path of the laser beam projected from said optical communication transmitter) towards said receiving station. Unlike other methods, systems and devices for aligning a laser beam emitted from said optical communication transmitter with a receiving station when said optical communication transmitter is displaced relative to said receiving station, the method, system and device of the present invention achieve tracking and pointing without the need to move any of the parts comprised in said optical communication transmitter relative thereto and without the need to transmit an optical signal from the receiving station toward the optical communication transmitter.

Said optical communication transmitter, as disclosed in said method and system, and said device is characterised in that it comprises a laser (18), a radio receiver (32). a microprocessor (14) and a liquid crystal on silicon spatial light modulator (24) comprising a diffractive element.

Said laser emits a laser beam. Said emitted laser beam is diffracted and reflected by the diffractive element comprised in said liquid crystal on silicon spatial light modulator which projects said laser beam, thus diffracted and reflected, over an area. Said area is that in which said receiving station is located and is a square when the area is perpendicular to the longitudinal axis of said projected laser beam, the longitudinal axis of said projected laser beam being parallel to the propagation path of said projected laser beam.

Said laser emits light at a centre wavelength, preferably selected from a wavelength of between 150 nm and 30000 nm, more preferably between 375 nm and 4800 nm, even more preferably between 1000 nm and 2000 nm. In a yet more preferred embodiment, said wavelength is 1550 nm.

Said laser is preferably a semiconductor laser, more preferably a photodiode laser. In the exemplary embodiment described herein, the laser is model L1550G1 from the company Thorlabs, emitting at a 1550 nm wavelength.

Liquid crystal on silicon (LCOS) spatial light modulators (SLM) are electronic devices similar to liquid crystal display screens (LCD screens) but designed for controlling the phase of the incident light, thus generating a phase image rather than an intensity image that is typically used in an LCD screen. They can behave like diffractive optical elements such as diffraction gratings or lenses by virtue of the type of digital hologram displayed thereon, but with the capacity of being electrically programmable (without mechanical moving parts) by virtue of, for example, a driving circuit controlled by a microprocessor. Preferably, the LCOS-SLM may be configured to modify the phase of a laser beam impinging thereon by codifying a phase function by a computer-generated image having different levels of grey so that the grey levels in the image reproduce phase levels from $-\pi$ to $+\pi$ radians in the impinging laser. In this way, the SLM can impart to the reflected laser different optical diffractive functions depending on the codified image displayed on the SLM screen upon which the laser beam is reflected. Moreover, the SLM diffractive mask can easily switch from one function to another or perform several such functions simultaneously. Thus, said liquid crystal on silicon spatial light modulator (LCOS-SLM) comprises a diffractive element. Holoeye can be cited as an example of such a SLM supplier.

Said diffractive element comprises an array of pixels which collectively modulate the phase of the laser beam incident thereon. In one embodiment, each pixel of the diffractive element displays a level of grey, such that the diffractive element displays a greyscale holographic pattern comprising a diffraction mask or combination of diffraction masks generated therein which results in diffraction and reflection of the laser beam that is emitted from said laser and incident thereon. Each mask, independent of its function, is a phase diffraction mask. Each holographic pattern comprises a diffraction mask/combination of diffraction masks which is/are generated in said diffractive element and is displayed thereon for the entire duration of an interval, an interval being defined by the time (in seconds) between which the said diffractive element is refreshed. Thus, if the diffractive element displays the same holographic pattern over a consecutive series of intervals, the laser beam which is projected from said diffractive element will be projected in the same way for each interval of said series of consecutive intervals during which said given holographic pattern is displayed thereon.

By using a LCOS-SLM in the fashion described herein, it is possible to regulate, amongst other variables, the width (i.e. angle) over which and/or direction in which a laser beam that impinges on it is reflected and, in this way, it is possible to perform beam shaping and focusing (i.e. fine pointing and tracking) of a laser beam projected from an optical communication transmitter such as a spacecraft without the use of mechanical moving parts to track a receiving station such as an Earth station, thus avoiding the costs and bulkiness associated with mechanical pointing systems. In the case of the preferred embodiment wherein the optical communication transmitter is a spacecraft such as a satellite, this is a great advantage because it allows integration with optical communications from smaller spacecraft and follows the current trends in space applications of the use of satellites smaller than 100 kg and even down to 3 kg.

In addition, by using a LCOS-SLM in the fashion described herein, the need to use a return optical link from the receiving station (e.g. Earth station) to the optical communication transmitter (e.g. satellite) is eliminated by replacing the return optical link acquisition used in the pointing with a low speed data radio link implemented, for example, at UHF or VHF, in order to close the control loop needed to perform and maintain the pointing, thus further simplifying the mode of implementation of the receiving station.

Said microprocessor controls the laser and the emission of the laser beam therefrom, preferably including the light intensity thereof and the pulsation of said laser beam, as well as the diffraction masks generated in said diffractive element. Thus, said microprocessor is a computer program product that preferably controls all or part of the electronics of the optical communication transmitter using computer readable program instructions. In a more preferred embodiment, in order to control the diffraction masks generated in said diffractive element, said microprocessor codifies a digital image, said digital image being reproduced in said diffractive element (i.e. said SLM screen), which acts in a similar way as a computer or television screen, but displays the digital image as phase values. By changing the codified image on said SLM into computer readable program instructions, it is possible to regulate the direction, span, focus and timing with which a laser beam that impinges on the SLM screen is projected through reflection and diffraction therefrom.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may include, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the method of the present invention, and in the system and device of the present invention, may be coded information in the form of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams (see FIG. 7) of the method and systems or the present invention which are implemented in the optical communication device and optical communication transmitter. It will be understood that each square or diamond-shaped block of the flowchart illustrations and/or block diagrams, and combinations of blocks in the flowchart illustrations and/or block diagrams, can be implemented by mechanical means, optical techniques or computer readable program instructions, or combinations thereof.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto the aforementioned microprocessor, a computer. other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of methods, systems and devices according to various embodiments of the present invention. In this regard, each block in the flowchart or block diagrams may represent a module. segment, or portion of instructions, which comprises one or more executable instructions for implementing the specified logical function(s). In some alternative implementations, the functions noted in the block may occur out of the order noted in FIG. 7. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Said radio receiver receives radiofrequency transmissions from said receiving station. Each radiofrequency transmission from said receiving station provides information to the optical communication transmitter on the efficiency of the communication link, as well as information on the quadrant of the projected laser beam which is detected in the photodiode receiver in the receiving station (i.e. information on the quadrant which is projected over the area in which the receiving station is located). This information is obtained by determining the frequency or the pulses of the subset of the set of intervals over which the quadrant of said laser beam is projected that are detected in said receiving station.

Said receiving station, as used in said method, system and device, is characterised in that it comprises a photodiode light receiver (52) for detecting said transmitted (i.e. projected) laser beam and a radio transmitter (60). Preferably, the receiving station comprises a photodiode receiver behind a very narrow light filter, in a primary focus of an optical detection device. More preferably, said optical detection device is a telescope driven by a computer-controlled alt-azimuthal mount.

Said photodiode receiver detects the laser beam projected from said optical communication transmitter, including the frequency of the pulses of said amplitude-modulated laser beam that are emitted during any given interval. The frequency of the pulses of said amplitude-modulated laser beam that are emitted during any given interval and detected by said photodiode receiver is unique to the subset of the set of intervals during which the projected laser beam is projected over each quadrant thereof. Thus, the frequency of the pulses of the subset of the set of intervals that are detected in said receiving station determines the quadrant of the projected laser beam which is detected by the receiving station and hence in which quadrant the receiving station is located. This information on the quadrant of the projected laser beam which is detected in the photodiode receiver in the receiving station (i.e. information on the quadrant which is projected over the area in which the receiving station is located) is then transmitted to said optical communication transmitter using the radio transmitter.

The radio transmitter of the receiving station preferably provides radio-frequency communication in the UHF or VHF bands. More preferably it is connected to an antenna controlled by a computer, which is more preferably implemented by a directive Yagi topology driven by an altazimuth mount controlled by said computer.

Note that the laser beam emitted from the laser to the liquid crystal on silicon spatial light modulator (i.e. the emitted, incident or impinging laser beam) may pass through at least one other optical component comprised in the optical communication transmitter or the optical communication device comprised therein before reaching the liquid crystal on silicon spatial light modulator. while the laser beam that is projected from the liquid crystal on silicon spatial light modulator before leaving the optical communication transmitter (i.e. the projected or transmitted laser beam) may pass through at least one other optical component after leaving the liquid crystal on silicon spatial light modulator. Preferably, either or both of said emitted laser beam and said projected laser beam pass through at least one other optical component comprised in said optical communication transmitter or said optical communication device, wherein each optical component is preferably selected from the group comprising a beam expander, a lens, a prism, fibre optics and a plane parallel plate. More preferably, either or both of said emitted laser beam and said projected laser beam pass through at least one beam expander. Thus, a laser beam that is otherwise very narrow, may be expanded so that it covers the whole screen area of the diffractive element comprised in the spatial light modulator and therefore makes an efficient use of the image displayed therein. When said optical component(s) comprise fibre optics, a fibre-optics coupler is more preferably also comprised therein.

In a particularly preferred embodiment of the method and system of the present invention, said optical communication transmitter is an optical communications satellite and said optical communications device is comprised in an optical communications satellite. Thus, a more particularly preferred embodiment of the present invention relates to a method and system that comprises at least one satellite and a receiver station, even more preferably wherein said receiving station is an Earth station.

Said method comprises the following steps, said system comprises means for carrying out the following steps and said device is arranged to carry out the following steps:
(i) projecting said laser beam in consecutive intervals over an area in which said receiving station is located by diffraction and reflection using said spatial light modulator;
(ii) dividing said projected laser beam into quadrants intersecting at the longitudinal axis of said projected laser beam;
(iii) interrupting the projection of each quadrant of said laser beam during each interval of a set of consecutive intervals by pulsation of said laser beam using amplitude modulation and by distortion of the wavefront of said laser beam using a pointing diffraction mask generated in said diffractive element for each interval of said set, wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency of the pulses of said amplitude-modulated laser beam that are emitted during any given interval are the same for all quadrants over which said laser beam is projected, and wherein the frequency of the pulses of said amplitude-modulated laser beam that are emitted during at least one interval of said set of intervals are different from the frequency of the pulses of said amplitude-modulated laser beam that are emitted during at least one other interval of said set of intervals;
(iv) identifying the quadrant of said projected laser beam which is detected in said photodiode receiver in the receiving station by determining the frequency of the pulses of the subset of the set of intervals over which the quadrant of said laser beam is projected, and communicating this information to said optical communication transmitter via said radio transmitter and said radio receiver;
(v) projecting said laser beam in consecutive intervals over the area which the quadrant of the laser beam identified in step (iv) was projected over by distorting the wavefront of the laser beam emitted from the laser using the pointing diffraction mask generated in said diffractive element which exclusively projected said quadrant of the laser beam in step (iii); and
(vi) repeating steps (ii) to (v) at least a further three times or until the angle between the longitudinal axis of said laser beam projected in step (v) and said longitudinal axis of said projected laser beam in step (ii) is less than $\pi/9500$ radians,
wherein the direction in which the longitudinal axis of said projected laser beam is pointed in steps (i) to (v) is changed every t seconds as a function of the displacement of the optical communication transmitter with respect to the receiving station by distorting the wavefront of the laser beam emitted from the laser using a tracking diffraction mask which is generated in said diffractive element,
wherein the intervals have a frequency of value r of between 10 and 500 Hz, the pulses have a frequency of value f of between 0.1 kHz and 100 MHz, and t is between 0.001 and 10 seconds,
wherein each tracking diffraction mask is used:
(a) alone in step ( ) and in the first iteration of step (ii); and
(b) in combination with a pointing diffraction mask in steps (iii) to (v) and in subsequent iterations of step (i).

In step (i), said laser beam is projected in consecutive intervals over an area in which said receiving station is located by diffraction and reflection using said spatial light modulator. Each interval of said consecutive intervals in the projected beam corresponds with the interval over which a hologram is continuously displayed on spatial light modulator before displaying a new hologram which is either the same or different therefrom (i.e. the interval between successive refreshments of said spatial light modulator). The intervals have a frequency of value r of between 10 and 500 Hz. If said spatial light modulator has a refresh frequency r, then the duration of each interval is less than or equal to $r^{-1}$. This means that the projected laser beam is emitted in pulses defined by the refresh frequency of said spatial light modulator. In a preferred embodiment of the system of the present invention, the means used for carrying out step (i) refer to the microprocessor, laser and SLM (and, thus, the diffractive element thereof), said microprocessor respectively providing/receiving computer readable program instructions or coded information to/from said laser and said SLM.

In a preferred embodiment of the present invention. the step (i) of projecting said laser beam over an area in which said receiving station is located comprises the steps of:
(a) estimating the position of the optical communication transmitter with respect to the receiving station and estimating the position of the receiving station with respect to the optical communication transmitter;
(b) pointing the longitudinal axis of said projected laser beam in a direction A towards the position of the receiving station estimated in step (a) by changing the attitude of the optical communication transmitter using at least one actuator;

(c) pointing said photodiode receiver in a direction B towards the position of the optical communication transmitter estimated in step (a) by changing the azimuth and/or altitude angles of said photodiode receiver. wherein said direction B is perpendicular to the focal plane of said photodiode receiver and parallel to said direction A; and (d) repeating steps (b) and (c) until the laser beam projected in step (b) is detected using said photodiode receiver. This preferred embodiment of the present invention describes a step of "coarse pointing" involving actuators. Coarse pointing typically has an error angle A of approximately $\pi/950$ radians (i.e. over a square having sides of E km in length at a distance of 600 km wherein E is approximately 2 km, whereby said square is taken to be the plane perpendicular to the longitudinal axis of the projected laser beam in which said receiving station is located), thus distinguishing it from the "fine pointing" used in steps (ii) to (vi) which does not require movement of any components in said optical communication transmitter and typically has an error angle A of less than less than $\pi/9500$ radians (i.e. corresponding to the aforementioned square having sides of less than 200 m at a distance of 600 km).

In step (a) of said preferred embodiment of the present invention, the position of the optical communication transmitter is estimated with respect to the receiving station and the position of the receiving station is estimated with respect to the optical communication transmitter. Said estimations comprise:

continuous estimation of the precise location of the optical communication transmitter by the microprocessor embedded therein, by using a GPS connected to it for timekeeping, together with the position of the receiving station using its geodesic reference (i.e. latitude and altitude according to, for example ETRS89); and continuous estimation of the position of the receiving station computer by using a GPS connected to it for timekeeping and its geodesic reference (i.e. latitude and altitude according for example to ETRS89), together with the two-line elements (TLE) of the optical communication transmitter and an orbit propagation algorithm such as Simplified Orbit Perturbations 4 (SPG4).

Once the position of the optical communication transmitter with respect to the receiving station and the position of the receiving station with respect to the optical communication transmitter have been estimated, the coarse pointing of steps (b) to (d) is performed until line-of-sight is established between said optical communication transmitter and the receiving station (and vice versa), following which said laser beam is projected in consecutive intervals over the area in which said receiving station is located by diffraction and reflection using said spatial light modulator as per step (i) of the method, system and device of the present invention. In order to ensure that said receiving station is located in the area over which said laser beam is projected, it is preferably first projected over an angle greater than the aforementioned error angle A. In a preferred embodiment of step (i) of the present invention, the laser beam is projected over an angle of between $\pi/18850$ and $\pi/180$ radians (i.e. over the aforementioned square having sides of between 100 m and 10 km in length). More preferably, the angle over which said laser beam is first projected is less than $\pi/950$ radians (i.e. over the aforementioned square having sides that are less than 2 km), even more preferably less than $\pi/1885$ radians (i.e. over the aforementioned square having sides that are less than 1 km). Consequently, the iterative process of steps (a) to (d) stops, allowing step (i) of the method, system and device of the present invention to take place, when the receiving station falls within the angle cast by the laser beam projected in step (b) and said laser beam is detected using said photodiode receive. Thus, under such circumstances, a first projection as per step (i) which comprises steps (a) to (d) of the aforementioned preferred embodiment of the present invention, may be thought of as "coarse pointing". Once the initial connection is confirmed by the receiving station, a signal is sent to the optical communication transmitter that starts step (ii) and thus commence the process of "fine pointing". In the aforementioned preferred embodiment of the system of the present invention, the means used for carrying out step (a) refer to the microprocessor, more preferably a microprocessor and a GPS, the means used for carrying out steps (b) and (c) refer to the microprocessor, laser, SLM (and, thus, the diffractive element thereof), photodiode and actuator, said microprocessor providing and receiving computer readable program instructions or coded information to said laser, said SLM and said actuator, and the means used for carrying out step (d) refer to the microprocessor, laser, SLM (and, thus, the diffractive element thereof), photodiode, radio transmitter and receiver.

An actuator. as used in said preferred embodiment or the present invention. is preferably an electric, mechanical or electromechanical device, more preferably a motor, thruster, reaction wheel or magnetorquer.

In step (i), said projected laser beam is divided into quadrants intersecting at the longitudinal axis of said projected laser beam. Said division is purely abstract, conceptually resulting in four parallel propagation paths, one along each quadrant, which intersect at the longitudinal axis of said projected laser beam, the laser beam, or portion thereof that is projected over (i.e. along the propagation path of) each quadrant being different from that projected over other quadrants in subsequent steps (iii) to (v). This step is conducted both for the laser beam projected according to step (i) in the first iteration of step (ii) and for the laser beam projected according to step (v) in subsequent iterations of step (i). In a preferred embodiment of the system of the present invention, the means used for carrying out step (ii) refer to the microprocessor, laser and SLM (and, thus, the diffractive element thereof), said microprocessor respectively providing/receiving computer readable program instructions or coded information to/from said laser and said SLM.

In step (iii), the projection of each quadrant of said laser beam is interrupted during each interval of a set of consecutive intervals by pulsation of said laser beam using amplitude modulation and by distortion of the wavefront of said laser beam using a pointing diffraction mask generated in said diffractive element for each interval of said set, wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency of the pulses of said amplitude-modulated laser beam that are emitted during any given interval are the same for all quadrants over which said laser beam is projected, and wherein the frequency of the pulses of said amplitude-modulated laser beam that are emitted during at least one interval of said set of intervals are different from the frequency of the pulses of said amplitude-modulated laser beam that are emitted during at least one other interval of said set of intervals. In a preferred embodiment of the system of the present invention, the means used for carrying out step (iii) refer to the microprocessor, laser and SLM (and, thus, the diffractive element thereof), said microprocessor respectively providing/receiving computer readable program instructions or coded information to/from said laser and said SLM.

Figure 9:
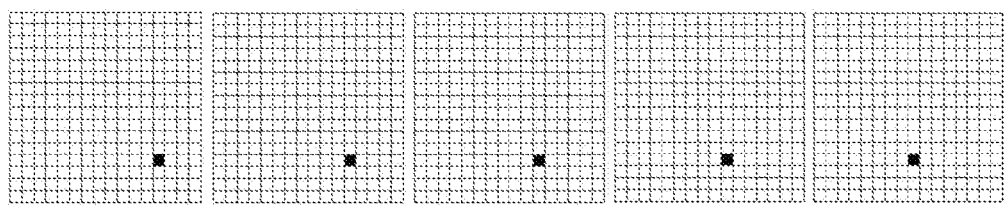
FIG. 9. The holograms corresponding to the tracking of the receiving station (in this embodiment, an Earth station) once it has been located to compensate the relative movement of the optical communication transmitter (in this embodiment, a satellite) over its orbit with respect to the stationary Earth station by assuming that this displacement is made in a direction that coincides with the horizontal coordinate of the diffractive element. A. (a) through (e) indicate the quadrant (in this embodiment, over the surface of the Earth) being illuminated while B (a) through (e) respectively show the hologram projected on the surface of the diffractive element to achieve this. In particular, (a) corresponds to the quadrant illuminated by the respective hologram once the Earth station is located and the laser is focused to an angle of $\pi/9500$ radians; (b) corresponds to the quadrant illuminated by the respective hologram projected in the LCOS when the satellite has moved an angle of $\pi/9500$ radians with respect to the location of the Earth station in (a); (c) corresponds to the quadrant illuminated by the respective hologram projected in the LCOS when the satellite has moved an angle of $2 \cdot \pi/9500$ radians with respect to the location of the Earth station in (a); (d) corresponds to the quadrant illuminated by the respective hologram projected in the LCOS when the satellite has moved an angle of $3 \cdot \pi/9500$ radians with respect to the location of the Earth station in (a); and (e) corresponds to the quadrant illuminated by the respective hologram projected in the LCOS when the satellite has moved an angle of $4 \cdot \pi/9500$ radians with respect to the location of the Earth station in (a).
Figure 9:
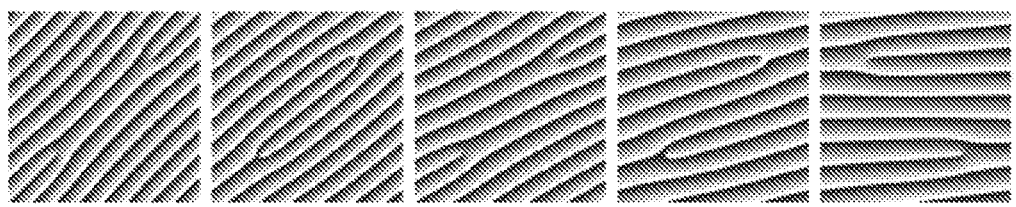

Said interruption during each interval of a set of consecutive intervals by pulsation of said laser beam using amplitude modulation results in a series of pulses which are emitted with a frequency f of between 0.1 kHz and 100 MHz, preferably between 1 kHz and 10 MHz. Frequency f is the same for all quadrants of the laser beam that are emitted at any given time (i.e. during any given interval) but differs for at least one interval of the set of intervals over which said laser beam is projected. On the other hand, said interruption during each interval of a set of consecutive intervals by distortion of the wavefront of said laser beam using a pointing diffraction mask generated in said diffractive element results in a given quadrant of said projected laser beam being projected over a subset of said set of intervals which is different from the subset of said set of intervals over which other quadrants of said laser beam are projected and wherein said quadrant is exclusively projected over at least one interval of said subset. In a preferred embodiment of the present invention, a given quadrant of said projected laser beam is exclusively projected over each interval of said subset (i.e. multiple quadrants of said projected laser beam are not projected over any given interval), as illustrated in FIG. 9.

The combination of interruption by pulsation of said laser beam using amplitude modulation and/or interruption by distortion of the wavefront of said laser beam using a pointing diffraction mask generated in said diffractive element that takes place in each interval, and the fact that any given quadrant of said projected laser beam is projected over a subset of said set of intervals which is different from the subset of said set or intervals over which other quadrants or said laser beam are projected, means that over said set of intervals over which each quadrant of said projected laser beam is interrupted, each quadrant of said projected laser beam is interrupted differently (i.e. whether by means of a pointing diffraction mask, which interrupts a given quadrant over a given interval, or by the aforementioned pulsation of said laser beam during a given interval, which interrupts said quadrant over which said pointing diffraction mask permits its projection during another given interval). Preferably, distortion of the wavefront of said laser beam using a pointing diffraction mask means that in any given interval a given quadrant of said projected laser beam is projected, wherein the quadrant of said projected laser beam which is projected is interrupted by pulsation of said laser beam at a frequency f which is different from that which is used to interrupt other quadrants of said projected laser beam when these are projected during other intervals. This means that each quadrant of said projected laser beam has a "signature" that is different from the other quadrants of said projected laser beam.

In step (iv), the quadrant of said projected laser beam which is detected in said photodiode receiver in the receiving station is identified by determining the frequency of the pulses of the subset of the set of intervals over which the quadrant of said laser beam is projected, and communicating this information to said optical communication transmitter via said radio transmitter and said radio receiver. Thus, in step (iv). the "signature" of the laser beam that is detected by the receiving station is determined in order to identify which quadrant of said projected laser beam was detected by said receiving station, and thus to identify the area in which said receiving station is located based on the area over which said quadrant, thus identified, was projected over. Preferably this is achieved by additionally synchronising the optical communication transmitter and receiving station using a timing signal. Once determined, this information is relayed to said optical communication transmitter by sending radio waves from the radio transmitter comprised in said receiving station to the radio receiver comprised in said optical communication transmitter. In a preferred embodiment of the system of the present invention, the means used for carrying out step (iv) refer to the microprocessor, laser, SLM (and, thus, the diffractive element thereof), photodiode, radio transmitter and radio receiver, said microprocessor respectively providing/receiving computer readable program instructions or coded information to/from said laser, said SLM and said radio receiver.

A preferred embodiment of the method, system and device of the present invention, is that comprising the following steps (iii) and (iv):

(iii) interrupting the projection of each quadrant of said laser beam during each interval of a set of consecutive intervals by pulsation of said laser beam using amplitude modulation and by distortion of the wavefront of said laser beam using a pointing diffraction mask generated in said diffractive element for each interval of said set, wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency and/or duration of the pulses of said amplitude-modulated laser beam that are emitted during any given interval are the same for all quadrants over which said laser beam is projected, and wherein the frequency and/or duration of the pulses of said amplitude-modulated laser beam that are emitted during at least one interval of said set of intervals are different from the frequency and/or duration of the pulses of said amplitude-modulated laser beam that are emitted during at least one other interval of said set of intervals;

(iv) identifying the quadrant of said projected laser beam which is detected in said photodiode receiver in the receiving station by determining the frequency and/or duration of the pulses of the subset of the set of intervals over which the quadrant of said laser beam is projected, and communicating this information to said optical communication transmitter via said radio transmitter and said radio receiver:

wherein the intervals have a frequency of value r of between 10 and 500 Hz, as defined above, and a duration of less than or equal to $r^{-1}$, the pulses have a frequency of value f of between 0.1 kHz and 100 MHz, as defined above, and a duration of less than or equal to $f^{-1}$, and t is between 0.001 and 10, as defined above. Thus, not only the frequency but also the duration of the intervals and pulses is relevant to determining the "signature" of the laser beam that is projected.

In step (v), the laser beam is projected in consecutive intervals over the area which the quadrant of the laser beam identified in step (iv) was projected over by distorting the wavefront of the laser beam emitted from the laser using the pointing diffraction mask generated in said diffractive element which exclusively projected said quadrant of the laser beam in step (iii). In other words, in step (v) the laser beam is projected in consecutive intervals over the area that the quadrant of the laser beam which was detected by said receiving station projected over in step (iv). In a preferred embodiment of the system of the present invention, the means used for carrying out step (v) refer to the microprocessor. laser and SLM (and, thus, the diffractive element thereof), said microprocessor respectively providing/receiving computer readable program instructions or coded information to/from said laser and said SLM.

In step (vi), prior consecutive steps (ii) to (v) are repeated at least a further three times or until the angle between the longitudinal axis of said laser beam projected in step (v) and said longitudinal axis of said projected laser beam in step (ii) [i.e. the iteration of step (i) prior to the iteration of step (v)] is less than $\pi/9500$ radians. Thus, steps (ii) to (v) are iterated to successively narrow the angle of projection of the laser beam so that it projects over an increasingly small area within which the receiving station is located. In one embodiment, steps (ii) to (v) are preferably repeated between a further 3 to 5 times (i.e. 4 to 6 times in total), more preferably a further 6 times. In another embodiment, steps (i) to (v) are preferably repeated until the angle between the longitudinal axis of said laser beam projected in step (v) and said longitudinal axis of said projected laser beam in step (ii) is less than $\pi/10000$ radians, more preferably less than $\pi/12000$ radians. In this way, the available light cast by said projected laser beam is concentrated over as small an area as possible and the longitudinal axis of said projected laser beam is closely aligned with the actual location of the receiving station laser beam. Collectively, the iterative process of steps (ii) to (v) and step (vi) may be thought of as "fine pointing". In a preferred embodiment of the system of the present invention, the means used for carrying out step (vi) refer to the microprocessor and the aforementioned means used to carry out steps (ii) to (v).

The aforementioned iterative process of "fine pointing" is achieved through the use of pointing diffraction masks. By way of a summary, fine pointing narrows the angle over which the projected laser beam projects by projecting the laser beam over an area in which said receiving station is located and:
  modifying the wave-front of the emitted laser beam using computer-generated holographic patterns displayed in the diffractive element, wherein each holographic pattern comprises a pointing diffraction mask, said receiving station being located in a subset of said area over which one quadrant of said projected laser beam projects;
  detecting the quadrant of said laser beam, thus projected, in a photodiode receiver in the receiving station and communicating information on said detected quadrant to the optical communication transmitter via said radio transmitter and said radio receiver before projecting said laser beam over the area over which said detected quadrant projects; and
  repeating the preceding two steps recursively to narrow the angle over which the projected laser beam projects and within which said receiving station is located, preferably to within the limits of the divergence of the projected laser beam.

While this is taking place the displacement of the optical communication transmitter (e.g. a satellite over the sky) with respect with the receiving station at several fractions of a degree per second also takes place such that a tracking diffraction mask is comprised in each holographic pattern displayed on said diffractive element, which corrects for this movement. Thus, in addition to the aforementioned "pointing" processes, a process of "tracking" is also achieved through use of tracking diffraction masks, wherein each tracking diffraction mask is used:
  (a) alone in step (i) and in the first iteration of step (ii): and
  (b) in combination with a pointing diffraction mask in steps (iii) to (v) and in subsequent iterations of step (i).

Tracking is required because after having generated a diffraction mask in said diffractive element which results in the projected laser beam projecting over an area in which the receiving station is located, a time t has elapsed, during which displacement of the optical communication transmitter with respect to the receiving station has taken place. Tracking is therefore achieved according to the present invention by changing the direction in which the longitudinal axis of said projected laser beam is pointed in steps (i) to (v) every t seconds as a function of the displacement of the optical communication transmitter with respect to the receiving station by distorting the wavefront of the laser beam emitted from the laser using a tracking diffraction mask which is generated in said diffractive element, wherein t is between 0.001 and 10 seconds. Therefore, a new tracking diffraction mask is generated in said diffractive element every t seconds, wherein each new tracking diffraction mask, thus generated, changes the direction in which the longitudinal axis of said projected laser beam was pointed in the interval prior thereto to a new direction (i.e. the angle at which it is projected from the optical communication transmitter is changed and the longitudinal axis of the laser beam is aligned with the centre of the area over which said laser beam was projected in the step previous thereto). In other words, said laser beam is projected over the same area as it was projected over when using the prior diffraction mask in the interval prior thereto and in which said receiving station is located (i.e. over the area of the plane in which said receiving station is located that is perpendicular to the longitudinal axis of said projected laser beam) in spite of said displacement. In a preferred embodiment, each new tracking diffraction mask, thus generated, changes the direction in which the longitudinal axis of said projected laser beam was pointed in the interval prior thereto to a new direction, assuming displacement of the optical communication transmitter with respect to the receiving station has taken place in said interval prior thereto. If a new tracking diffraction mask is used in combination with a pointing diffraction mask which points the projected laser beam (or a quadrant thereof) over a subset of the area over which it was projected using the diffraction mask prior thereto (by virtue of fine pointing), the new tracking diffraction mask will project over the same area as it was projected over when using the diffraction mask prior thereto, with the pointing diffraction mask used in combination therewith pointing the projected laser beam (or a quadrant thereof) over said subset of said area. In this way, for two consecutive intervals 11 and 12 separated by time t, the area over which the laser beam (or a quadrant thereof) is projected during interval 12 is the same as the area, or a subset of said area, over which the laser beam (or a quadrant thereof) is projected in 11, even though different diffraction masks are generated in said diffractive element during 11 and 12.

Each holographic greyscale pattern displayed in said diffractive element over any given interval or set of intervals is calculated to comprise a diffraction mask or combination of diffraction masks. Since said holographic greyscale pattern always comprises a tracking mask, for any given interval in which it is displayed it points the longitudinal axis of said projected laser beam in a direction which (at least momentarily) means that said laser beam will project over the same area as it was projected over when using the diffraction mask prior thereto, with the pointing diffraction mask used in combination therewith pointing the projected laser beam (or a quadrant thereof) over said subset of said area, in order to achieve tracking.

Thus, in a preferred embodiment of the method, system and device of the present invention, each tracking diffraction mask or each combination of tracking diffraction mask and pointing diffraction mask is comprised in a holographic greyscale pattern (41) that is calculated in said microprocessor and displayed in said diffractive element, wherein said holographic greyscale pattern, thus displayed, projects the projected laser beam over the area which it was projected using the tracking diffraction mask or the combination of tracking diffraction mask and pointing diffraction mask prior thereto, or over a subset of said area over which it was projected using the tracking diffraction mask or the combination of tracking diffraction mask and pointing diffraction mask prior thereto. In other words, each tracking diffraction mask is comprised in a holographic greyscale pattern which projects the projected laser beam over the area which it was projected using the tracking diffraction mask used immediately prior thereto, while each combination of tracking diffraction mask and pointing diffraction mask is comprised in a holographic greyscale pattern which projects the projected laser beam either:

(a) over the area which it was projected using the combination of tracking diffraction mask and pointing diffraction mask used immediately prior thereto, when the pointing diffraction masks used in each combination are the same: or (b) over a subset of the area over which it was projected using:
  (i) the tracking diffraction mask used prior thereto when said combination is the first combination used after using a tracking mask: or
  (ii) the combination of tracking diffraction mask and pointing diffraction mask used prior thereto when the pointing diffraction masks used in each combination are different.

In a preferred embodiment of the method, system and device of the present invention, each tracking diffraction mask or combination of tracking diffraction mask and pointing diffraction mask that is generated in said diffractive element distorts the wavefront of the laser beam and projects an image I(x,y) (42) over said area, wherein said diffractive element comprises a matrix of pixels, each pixel being defined by an p coordinate and a q coordinate, wherein the pixel (p,q)=(0,0) is the pixel at the centre of said matrix, and wherein said diffraction mask or combination of diffraction masks is comprised in a holographic greyscale pattern which is calculated in a microprocessor and displayed in said diffractive element, wherein each pixel (p,q) of said matrix is assigned a level of gray. g'(p,q) between 0 and w calculated according to the following equation:

$$g'(p,q) = (g(p,q) + g_{\varphi\theta}(p,q)) \bmod(w)$$

wherein:

$$g(p, q) = \frac{w}{2\cdot\pi} \cdot \psi(p, q) \text{ and}$$

$$g_{\varphi\theta}(p, q) = g_\theta(p', q')$$

wherein $g_\theta(p', q')$ is a calculated from $g_\theta(p, q)$ using the following rotation matrix:

$$\begin{pmatrix} p' \\ q' \end{pmatrix} = \begin{pmatrix} \cos(\varphi) & -\sin(\varphi) \\ \sin(\varphi) & \cos(\varphi) \end{pmatrix} \cdot \begin{pmatrix} p \\ q \end{pmatrix}$$

wherein:

$$g_\theta(p, q) = \frac{w}{2\cdot\pi} \cdot \left[\left(2\cdot\pi\cdot\frac{p}{n}\right) \bmod(2\cdot\pi)\right]$$

wherein:
p is the abscissa coordinate of pixel (p,q);
q is the ordinate coordinate of pixel (p,q);
w is the grey value that provides 2·π phase modulation in said diffractive element;
mod(w) is the module operation over w;
ψ(p,q) is the phase function of the inverse Fourier transform of said image and is calculated according to the following equation:

$$A(p,q)e^{i\cdot\psi(p,q)} = FT^{-1}[I(x,y)]$$

wherein:
$FT^{-1}[I(x,y)]$=inverse Fourier transform of said image
A(p,q)=is the amplitude of the inverse Fourier Transform of said image
i=imaginary unit
φ is the azimuthal deflection angle in radians with respect to the longitudinal axis;
n is calculated according to the following formula:

$$n = \frac{\lambda}{\sin(\theta) \cdot l}$$

wherein:
λ is the wavelength in metres of the laser beam;
l is the length of one side of the pixel in meters; and
θ is the zenith deflection angle in radians with respect to the longitudinal axis; and
mod(2·π) is the module operation over the angular function.

The advantage of calculation of each tracking diffraction mask or combination of tracking diffraction mask and pointing diffraction mask in this manner is that it involves a Fourier transform which is simplified by the aforementioned formulae by virtue of some Fourier transform functions already being calculated in the microprocessor memory so that it is only necessary to perform rotations and multiplications, rather than carry out complex calculations requiring greater microprocessor power.

Preferably w is between 150 and 500, more preferably between 200 and 360, even more preferably between 250 and 260, still more preferably 255.

A preferred embodiment of the method, system and device of the present invention comprises an additional step (vii) after step (vi) of transmitting further information to said receiving station by controlling the intensity and amplitude modulation of said projected laser beam, wherein the direction in which the longitudinal axis of said projected laser beam is projected is changed by distorting the wavefront of the laser beam emitted from the laser using a tracking diffraction mask in combination with said pointing diffraction mask generated in the last iteration of step (v). Thus, step (vi) comprises transmitting information to said receiving station which is encoded by said projected laser beam. Preferably, the transmission of information may take place using a standard transmission protocol such as ON-OFF keying. This step of transmitting further information requires changing the tracking diffraction mask used in combination with the pointing diffraction mask generated in the last iteration of step (v) every t seconds in order to account for the displacement of the optical communication transmitter relative to said receiving station whilst transmitting said further information. Thus, this step of transmitting further information uses a pointing diffraction mask that maintains the laser beam focused over the receiving station combined with a tracking diffraction mask that corrects for the inherent movement of the optical communication transmitter (e.g. as a satellite along its orbit). At the same time, the receiving station more preferably computer uses the stored RE (two-line elements) of the optical communication transmitter and the SPG4 algorithm to estimate the movement of the optical communication transmitter and follow it, thus maintaining the optical communications fink. A preferably communication transmission speed for this optical link in free space is 10 Mbps (10 megabits per second) or greater, more preferably 50 Mbps or greater, even more preferably 100 Mbps or greater. In a preferred embodiment of the system of the present invention, the means used for carrying out step (vi) refer to the microprocessor, laser, SLM (and, thus, the diffractive element thereof) and photodiode of the receiving station, said microprocessor respectively providing/receiving computer readable program instructions or coded information to/from said laser and said SLM.

Information on the quality of the link for transmission of further information is fed back to the optical communication transmitter by the receiving station by using the radio link through the Yagi antenna. Any small errors in tracking that may adversely affect the quality of the link for transmission of further information are, in a preferred embodiment, compensated for by the microprocessor of the optical communication transmitter changing the characteristics of the diffraction mask or combination of diffraction masks that are generated in the diffractive element as holographic patterns displayed on the SLM to improve the quality of the communication.

Example

Herein described, with reference to the aforementioned figures and in accordance with the numbering adopted herein, is a preferred but not limiting example of the system, method, device and optical communication transmitter according to the present invention, the following being an example of a preferred, non-exclusive, embodiment within the limits defined herein.

Thus, herein described is a fine pointing and tracking system and device, wherein said system or device, when implemented on a satellite (100) as optical communication transmitter, is configured to perform the beam shaping associated with fine pointing to and tracking of an Earth-based receiver station (110) by diffractive reflection. Thus, the system, method, device and optical communication transmitter according to the present invention finds application in satellite communications by implementing the optical transmitter system or device (10) like the one shown in FIG. 1. In the embodiment shown in FIG. 1, the emitter control electronics (12) in communication with the on-board computer of the satellite (OBC, microprocessor 14), control the laser photodiode (16) light intensity and switching frequency (i.e. pulse frequency) to transmit information by virtue of being diffracted and reflected by the interference pattern that is displayed on the liquid crystal on silicon spatial light modulator (LCOS-SLM, 24) device.

The laser light (18) produced, is introduced into fibre optics (15) by a fibre optics coupler (20) and controlled in intensity with a closed loop from a measurement performed by an isolator (21) and sensed by a photodiode (13) connected to an analog to digital converter of the control electronics (12). The fibre optics (15), goes through a beam expander (22) and collimation lens (23) in order to cover the whole SLM screen (24), and, once reflected in the latter, it is projected towards the free space through a protective plane parallel plate (26) towards the receiver.

In this embodiment of the invention, the laser that generates the communication in the satellite platform is model L1550G1 from the company Thorlabs, which is an infrared laser of 1550 nm wavelength, and the spatial light modulator is the model GAEA-2-TELCO-033 of the company Holoeye. This SLM is handled by a JD2704 Microdisplay driving IC and seen as a computer monitor by the control electronics (12) with a resolution of 4160×2464 image elements (pixels). A maximum square of 2464×2464 pixels is used to build the hologram.

In this embodiment, the LCOS-SLM, besides reflecting the laser beam, is used as a programmable optical unit by electrically programming it to display a diffractive image that codifies a phase function by establishing an intensity of grey for each pixel (x,y) of said image I(x,y), wherein said intensity is given by the phase in the function $\exp(i\psi_1(x,y))$ where $\psi_1(x,y)=[y_x x+y_y y]$ (mod $2\pi$), where x, and y represent the pixel coordinates, $y_x$ and $y_y$ are the derivatives of the phase in the x and y directions of the SLM pixel array, and (mod $2\pi$) is the module operation over the angular function.

Figure 1:
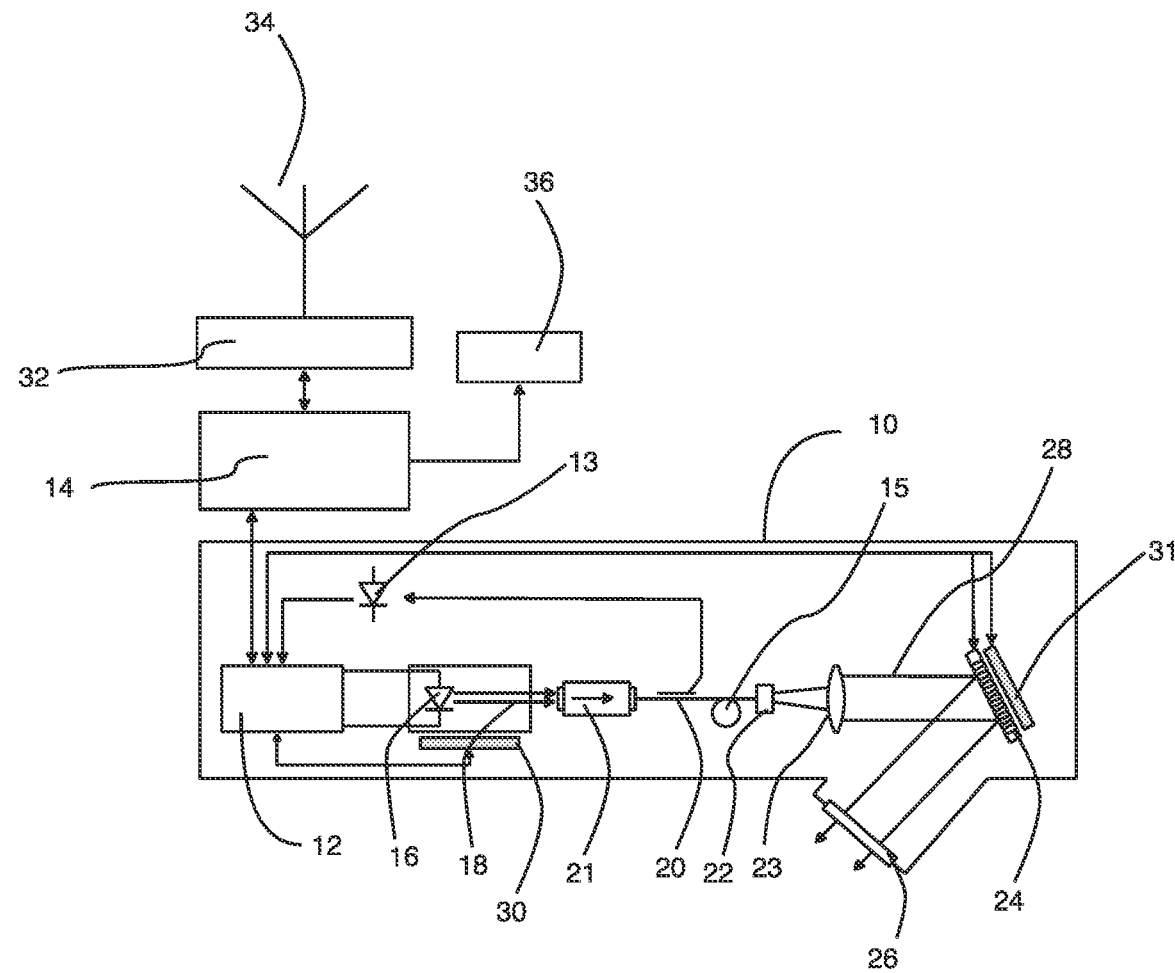
FIG. 1. An optical communications transmitter device that comprises a fine pointing and tracking system connected to an embedded control computer that feeds quality-of-link data from a receiving station through a UHF radio link and tracks its position in space and timing with a GPS receiver according to one embodiment of the invention.

In one possible implementation of FIG. 1 the fibre optics coupler and splitter are implemented with a model TW1550RIA1 from Thortabs and the beam expander by an HBE-1064-20x part from Hyperion Optics.

The electronics of the emitter (12) uses a SmartFusion 2 SoC from Microsemi to communicate, via LVDS, with and IC-HC integrated circuit from IC-Haus that controls de light intensity and switching of the laser diode (16). A G8935 MSM GaAs photodetector (13) senses part of the light emitted by the laser diode, and after being amplified by a LTC6268 operational amplifier from linear it is converted to digital by an ADS1278 analog-to-digital (A/D) converter and sent to the SmartFusion 2 SoC as feedback on light intensity. This A/D converter is able to independently handle up to eight A/D conversions and is also used for acquiring the temperatures of the laser and SLM thermal blocks (30 and 31). The thermal blocks are implemented by a Peltier module model 2MC10-081-20 from RMT properly biased from the SmartFusion 2 SoC by generating two PWM waveforms that drive one LMD1820 integrated circuit for each Peltier. The feedback on temperature is realized by two PT1000 resistors, one at each Peltier module. conditioned by the circuit featured in Figure number 2 of Texas Instruments Application Note AN-1559 entitled RTD Interface Solutions (http://www.ti.com/lit/an/snoa481b/snoa481b.pdf) and connected to two inputs of the ADS1278 A/D converter.

The electronics of the emitter (12) is connected through a CAN interface with the satellite's on-board computer (14), implemented with a STM32H743VI microprocessor, that handles the optical communications and the telemetry and telecommand (TM/TC) interface with a UHF radio transceiver (32) connected to an omnidirectional antenna (34). The onboard computer handles the communications with the payloads of the satellite and, in particular with the satellite's memory, to generate and send high data rates to the optical emitter and TMITC to the radio transceiver. For timekeeping and position estimation, the on-board computer uses a GPS receiver implemented using an AsteRx4 by Septentrio. The position estimation is handled by the on-board computer that relies on an SPG4 algorithm to propagate its orbit and correct it using the data fed by the GPS unit. The TM/TC radio transceiver is implemented by using an ADF7021 transceiver IC controlled by a STM32F405 microprocessor that connects to the onboard computer via a RS-422 port. The transceiver IC uses a RF6886 amplifier to produce 0.5 W of radio power for transmission and a TQP3M9007 for amplifying the receiving radio power; a PE4250 RF switch controlled by the microprocessor selects the communication mode either Tx or Rx. The TM/TC commands are sent and received using four 500 mm flex antenna dipoles attached at the sides of the satellite.

The optical receiving station (110), shown in FIG. 2, is implemented with a similar system suited for the low light intensity received from the satellite and the radio power needed to reach it. A telescope (50), mounted on a computer-controlled azimuth mount (54), receives the laser light (18) from the satellite emitter and focusses it on a receiving sensor (52), which in this case is an avalanche photodiode with a narrow band infrared filter situated in its primary focus. The parabolic mirror (58) must have enough light amplification capacity to be reflective in the laser wavelength that typically sits on the infrared side of the spectrum. The computer (58) receives the data, through an USB interface, from the photodiode amplifier and an analog-to-digital conversion stage (59) and communicates with a radio transmitter or radio station (60) to close the communication loop with the satellite that allows it to direct the pointing and subsequent tracking of it. The radio transmitter is connected to a Yagi antenna (62) driven by a rotator (64). that is basically a simple altazimuth mount, connected a rotor controller (66) and a radio transceiver to communicate with the satellite in the UHF or VHF bands. A GPS receiver (68) is used to receive a timing signal to synchronize the communications between the station and the satellite (100).

In a typical implementation of the Earth station a Meade ACF-SC 355/3550 355.6 mm (14 inch) UHTC LX200 GoTo telescope mounts a G6849 MSM Photodetector from Hamamatsu at its focus with infrared radiation detection capacity in the laser wavelength of 1550 nm. A 1550 nm Hard Coated Bandpass Interference Filter from Edmund Optics is fitted on top of the photodiode optical window to increase the signal-to-noise ratio of the receptor. The aforementioned telescope incorporates its own alt-azimuthal mount with possibility of connection to a PC computer through a COM to USB or wifi by using a SkiFi Ill adapter.

The photodiode consists of four detectors which each of them produces a current proportional to the light impinging on it and is able to respond to light pulses for establishing communication links of up to 120 MHz.

Having four detectors in the photodiode used has the advantage of using the light intensity on each of them to guide the pointing of the telescope toward the emitter.

Each photodiode current is converted to voltage by a current-to-voltage converter implemented with a LTC6268 operational amplifier and, after filtering the DC bias, shaped with a comparator implemented by an LTC6268. The shaped voltage is then fed to a LTC6754 comparator that converts it into an LVDS fine that is finally connected to a SmartFusion 2 SoC that receives the digital signal. This signal is then sent to the control computer using a FTDI as interface to the USB port. The thermal block for the receiving photodiode is implemented by a 2MC10-081-20 from RMT Peltier module property biased from the SmartFusion 2 SoC by generating one PWM waveform that drive one LMD1820 integrated circuit connected to the Peltier. The feedback for temperature control is realized by a PT1000 resistor conditioned by the circuit featured in the Figure number 2 of Texas Instruments Application Note AN-1559 entitled RTD Interface Solutions and connected to two inputs of the ADS1278 A/D converter.

The antenna is implemented a X-Quad antenna from WiMo Antennen on an Alpha Spid BIG-RAS HR Rotor connected to a MD-01 rotor controller, which is configured and controlled by the PC computer via a USB interface. The radio transceiver may be implemented by a Kenwood TS-2000 connected to the computer through a COM port via a COM-to-USB interface. The computer controls the radio communication with the satellite using three software packages. as follows:

Ham Radio Deluxe pro satellite telecommand and telemetry, doppler correction and rotor control.

HDR Rotator control to communicate with the MD-1 rotor controller.

HRD Satellite Tracking to follow the satellite on its orbit and determine the contact instants and aim the telescope altazimutal mount to the satellite on its passage upon the Earth station.

Finally, the time tracking is obtained by a Septentrio PolaRx5 multi-frequency GNSS reference receiver connected to the computer via USB, which has a capacity of updating time information every 10 ms.

In a practical implementation the TM/TC radio link is implemented in a frequency of 437,405 MHz using 10 W of power and a simple Data Layer protocol based on the Unnumbered Information Frames (UI-Frames) of the AX.25 protocol. The reference by James Miller (G3RUH), "9600 Baud Packet Radio Modem Design" http://www.amsat.org/amsat/articles/g3ruh/109.html is used to implement the communications.

Figure 3:
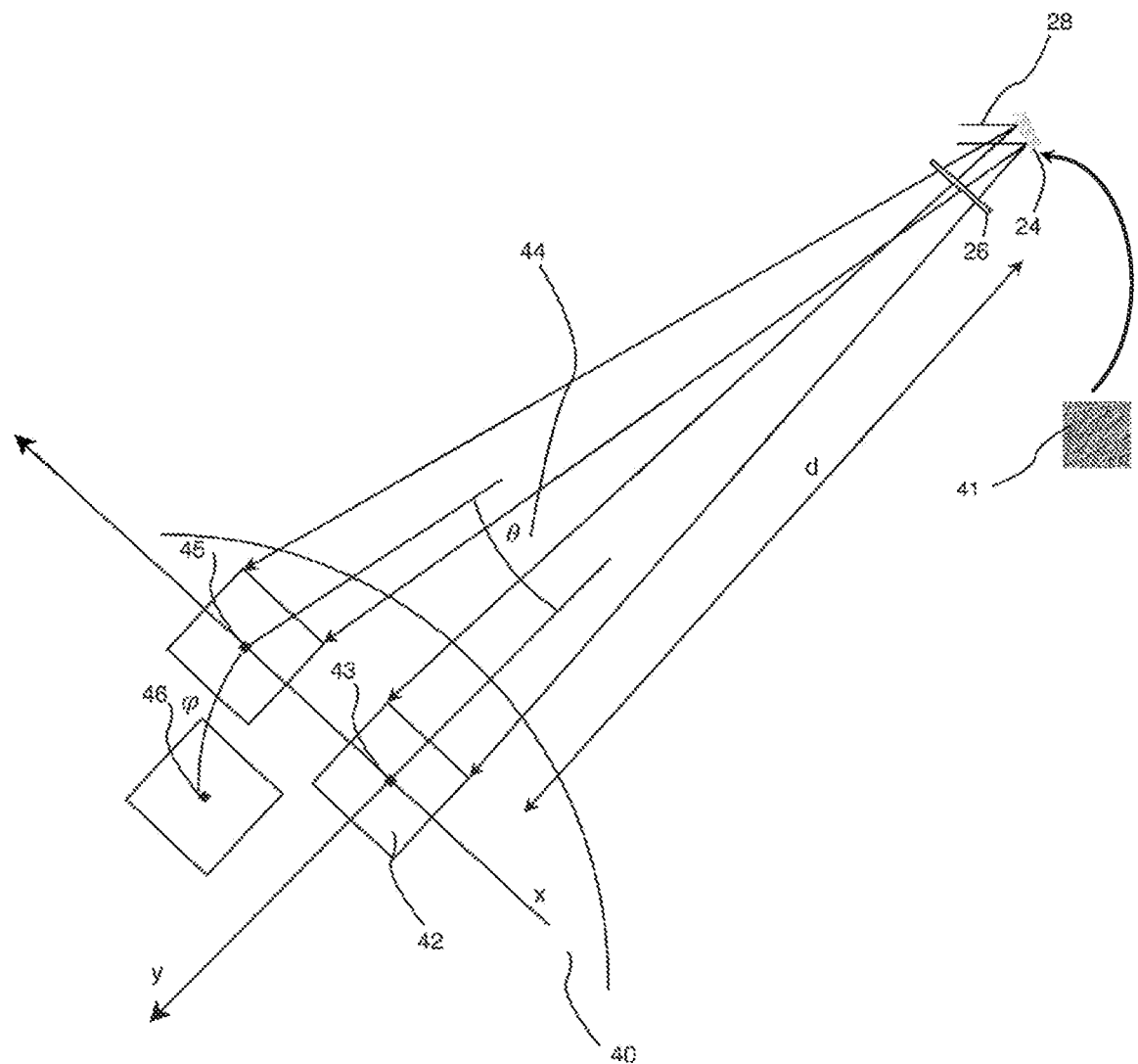
FIG. 3. Pictorial representation of how the impinging laser is reflected on the surface of the SLM, in which a hologram is presented and used to move an illuminated square pattern on an area (e.g. the surface of the Earth).

By using the implementation described as shown in FIG. 2 it is possible to establish an optical free-space communications downlink, i.e. from the satellite to the Earth station. FIG. 3 shows how the phase plane displayed on the SLM (24) is projected on the surface of the Earth (40) to create an image (42) where it is represented by a square, shown in the Figure for clarification purposes but not actually being projected on the Earth, whose side length, L, is given by the equation:

$$L = 2 \cdot \frac{\lambda \cdot h}{sp}$$

Where, $\lambda$ is the wavelength of the light (m) used to set the optical link, h is the height of the orbit of the satellite and sp the minimum spatial period of the phase displayed in the SLM (24) which is given by four times the pixel size (i.e. length or side of each pixel. m) of the SLM. A maximum frequency of four is chosen for the SLM to not reduce the efficiency of the image projected on the Earth.

The frame surrounding area (42) is not actually projected and is included in FIG. 3 for clarity and represents the maximum field of view of the SLM. What is projected on the surface of the Earth and therefore illuminated by the laser light is the square (43) (i.e. the image), which may be moved and/or made bigger or smaller provided that it stays within the reference framework as explained herein being this one of the distinctive aspects of the present invention.

Figure 4:
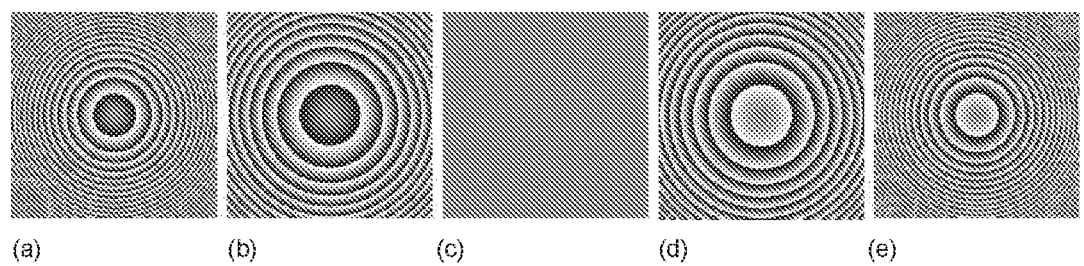
FIG. 4. A. Five digital holograms (a) to (e) represent holographic lenses to compensate collimation mismatches within the optical transmitter system by implementing optical powers of 174 $m^{-1}$, 87 $m^{-1}$, 0, −87 $m^{-1}$ and −174 $m^{-1}$ respectively; and B. five digital hologram patterns (a) to (e) that when projected on the SLM which is illuminated by a laser produce a reflection of the beam by an angle of −2°, −1, 0°, +1° and +2° respectively.
Figure 4:
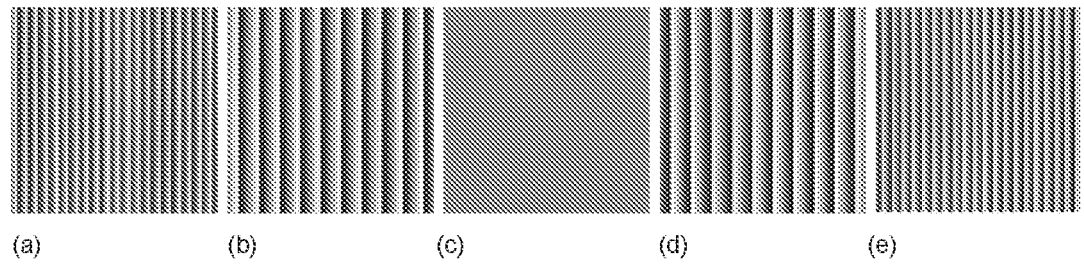

For an embodiment of the invention we may have λ=1550 nm, h=600 km and sp=4×3.74 µm (a period of 4), for the pixel size of GAEA-2-TELCO-033 by Holoeye; this results in a size for the field of view or the SLM or 125 km per side. As the GAEA-2-TELCO-033 has 2464 pixels on its smaller side this means that every pixel on the SLM has the capability, with a proper phase mask (41), to be projected on a 50 m square (43) on the surface of the Earth. For a typical embodiment of this invention the SLM is configured to project on the surface of the Earth squares of size length 4000 m, 2000 m, 1000 m, 500 m and 200 m, which provide a reasonable spot size (see below). FIG. 4A (a) to (e) shows phase holograms that may be projected on the SLM to compensate collimation mismatches within the optical transmitter system to create a centred image, for the satellite at an orbit of 600 km in height, over a square of said dimensions. These holograms projected on the surface of the Earth are used to achieve fine pointing of the satellite towards the Earth station once it has been located.

To compensate for an orbital speed of the satellite of 7.6 km·s$^{-1}$ for an orbit of 600 km in height or 0.72·s$^{-1}$ as seen from the Earth station reference frame, the deflection of the laser beam by either of two programmed angles, θ and φ [represented by (44) and (46) in FIG. 3], may be achieved by using an appropriate hologram on the SLM (24). The projection of a repetitive bar pattern hologram with a defined period on the SLM modifies the incident angle, θ [represented by (45) in FIG. 3], as given by the diffraction equation:

$$\sin(\theta) = \frac{\lambda}{sp}$$

wherein λ and sp have the same meaning as defined previously. By taking λ=1550 nm and sp=4×3.74 µm we have a deflection angle of ±6°, i.e. a projection span of 12°.

If we want to project an image I(x,y) on the surface of the Earth the microprocessor of the optical communications transmitter will create a hologram to project on the surface of the SLM represented by a function g'(p,q) defining the gray levels of its pixels by the function:

g'(p,q)=(g(p,q)+g$_{φθ}$(p,q))mod(w)

wherein $$g(p, q) = \frac{w}{2 \cdot \pi} \cdot \psi(p, q)$$

and wherein ψ(p,q) is the phase function of the inverse Fourier transform of said image, and w the maximum grey value of a pixel (p,q) in the diffractive element.

If we assume a deflection only on the x axis, any angle between the referred span may be obtained by creating a hologram by assigning a level of grey, g$_{φθ}$(p,q), to any given pixel on the SLM defined by coordinates (p, q) given by the equation:

$$g_{\varphi\theta}(p, q) = \frac{w}{2 \cdot \pi} \cdot \left[\left(2 \cdot \pi \cdot \frac{p}{n}\right) \bmod(2 \cdot \pi)\right]$$

wherein $$n = \frac{\lambda}{\sin(\theta) \cdot l}$$

where p is the abscissa coordinate of any given pixel of the SLM array taking as (0,0) the coordinate at the centre of the array, g$_{φθ}$ is the level of grey of pixel (p,q), and n is the ratio between sp, defined before, and the I=3.74 µm (pixel size for the selected SLM). For a deflection restricted to the x axis the corresponding grey level for any point (p,q) with the same p coordinate will be the same, i.e. g$_{φθ}$(p,q)=g(p).

As a practical example, FIG. 4B (a) shows a diffraction pattern that reflects the impinging light (28) in FIG. 1 by changing the angle −2 degrees in the x direction, FIG. 48 (*b*) reflects the angle changing it −1 degree in the x direction, FIG. 4B (c) does not produce angle modification, FIG. 48 (*d*) changes the angle +1 degree, and FIG. 45 (*e*) changes the angle through +2 degrees. FIG. 3 shows how the projection of a suitable hologram (41) in the SLM deflects the projection of the pixel (43) by an angle given by a (44) and directs the light to the new position (45) over the surface of the Earth.

Changing the angle in the direction of the y axis is produced by rotating the diffraction pattern by that angle, φ (see FIG. 5A) as defined by the rotation matrix that produces a hologram with grey levels at the point (p', q') from the hologram with grey levels with no rotation, that is to say:

$$\begin{pmatrix} p' \\ q' \end{pmatrix} = \begin{pmatrix} \cos(\varphi) & -\sin(\varphi) \\ \sin(\varphi) & \cos(\varphi) \end{pmatrix} \cdot \begin{pmatrix} p \\ q \end{pmatrix}$$

and now g$_{φθ}$(p,q) will be given by g$_{φθ}$(p,q)=g$_θ$(p',q')

where g$_θ$ is defined as:

$$g_{\varphi\theta}(p, q) = \frac{w}{2 \cdot \pi} \cdot \left[\left(2 \cdot \pi \cdot \frac{p}{n}\right) \bmod(2 \cdot \pi)\right]$$

and mod(2·π) is the module operation over the angular function.

Figure 5:
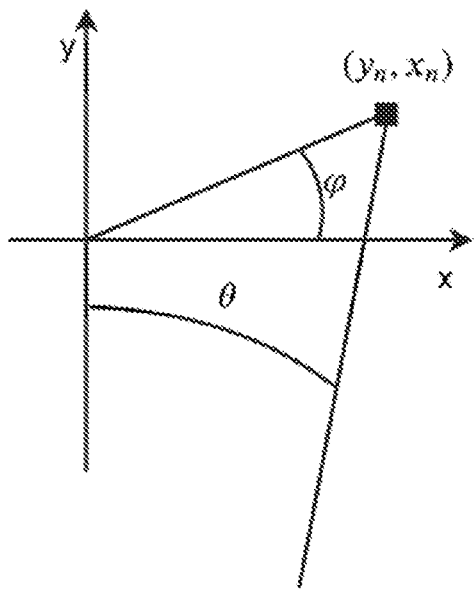
FIG. 5. A. Pictorial definition of the position of a square pattern (e.g. on the surface of the Earth) defined by coordinates ($y_n$, $x_n$) with dependence on two defined angles, θ and φ, and B. how two holograms, (a) and (b). corresponding to angular displacements p and 9 respectively, are combined to obtain the holographic pattern (c) illuminated on said area at any position within the field of view of the sensor.
Figure 5:
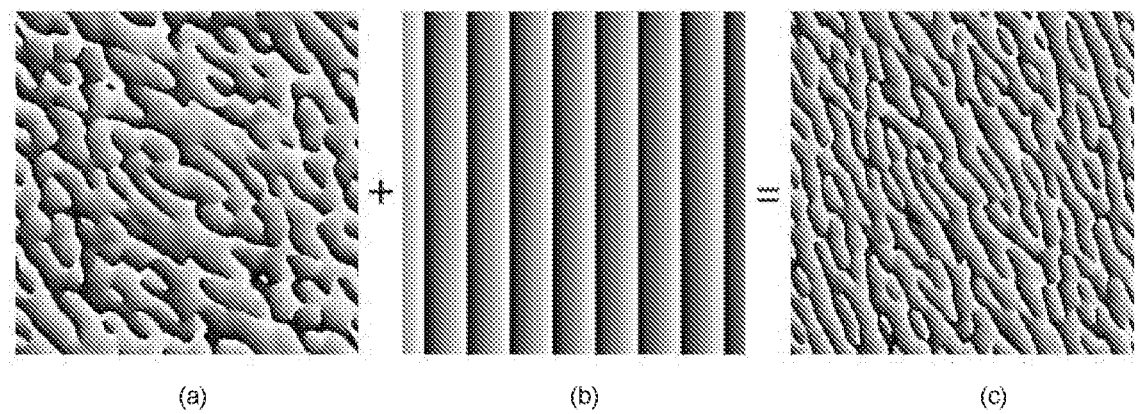

FIG. 5B shows an example where the hologram in FIG. 4B (a) to be projected on the SLM has been rotated by 30°. thus producing the rotation of the pixel projected over the surface of the Earth by 30°. [represented by (46) in FIG. 3], added to a deflection of 2° on the x axis. By proceeding as described, any pixel within the field of view of the sensor (42) may be addressed.

The free space laser based optical emitter (10) is integrated together with the onboard computer (14), the RF radio link (32), and the GPS module within a 6U Cubesat satellite (100), in a proposed implementation, providing an effective implementation for downloading a high quantity of data every time the satellite and Earth station have direct vision. The link budget for the downlink assuming a laser power of 1 W and considering the following losses in its transmission toward Earth:

50% of insertion losses of due to the optical elements and SLM in the emitter, which accounts for 3 dB.
  82 dB of geometric losses given by the ratio of the receiving light energy received over a square of 4 km in side and a 355.6 mm (14 inch) telescope, as measured in ISO 80000-3:2006.

- 1 dB losses due to atmospheric molecular absorption modeled as 1% of the traveled distance (in km) through the Earth atmosphere assumed to be 100 km high, as measured in ISO 80000-3:2006.
- 1 dB as insertion losses of the receiver considered as 20% of the incoming light, derived from the losses in the telescope and 1550 nm filter and assuming that all the light is hitting the receiving photodiode, as measured in ISO 80000-3:2006.
- The error in pointing the telescope toward the satellite assumed to be 2 km equivalent to 12° of arc at 600 km. that for the selected telescope (f number equal to 5) translates to 6 mm at its focus, makes to position the photodetector out-of-focus and creates losses of 5 dB. as measured in ISO 80000-3:2006. All these losses add up to 92 dB, as measured in ISO 80000-3:2006, and result in a receiving power at the photodiode of 0.6 nW. As the G8931 photodetector is able to produce discernible signals by receiving 6 pW we count with +20 dB of margin to prove that the optical communication between the emitter and receiver is feasible.

The problem of fine pointing between the satellite (100) and the ground base station (110) arises because even if the base station location is known to with a few meters of error (as it is not movable relative to the surface of the Earth and its location can be determined by GPS elements and geodesic measurements) the determination of the satellite location can imply errors that. although they are typically much lower than 2 km. can sometimes be as big as 2 km for a typical satellite orbit of 600 km from Earth. This error is s 0.2° in the location of the base station, from the point of view of the satellite. that must be corrected by the laser transmitter in the satellite.

Once this error has been corrected, the satellite must carry out tracking that compensates for its own movement of 7.6 km/s that, at an orbit of 600 km in height. corresponds to 0.72°/s. Moreover, the optical communication transmitter system must concentrate a maximum of light on the ground base station and, thus. produce the highest signal to noise ratio. in order to achieve the objective data speed of, for example, 100 Mbps.

Figure 6:
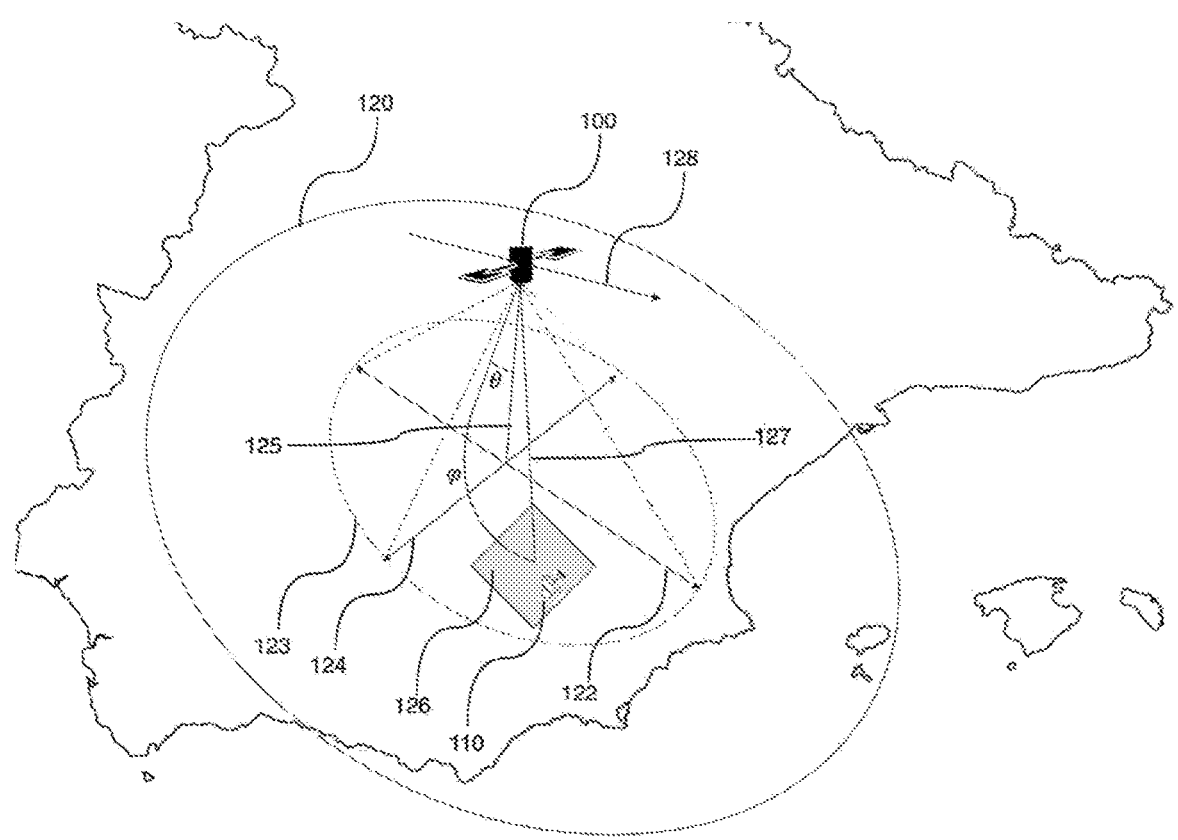
FIG. 6. Pictorial situation of a satellite 100 as said optical communication transmitter over an Earth station 110 as said receiving station which is situated, by way of example in Nerpio (Spain), where 120 represents the satellite visibility circle, 122 the x orthonormal axis of satellite's LCOS-SLM field of view 123, and 124 the corresponding y axis whose center is defined by the line perpendicular to the surface of the Earth that crosses the satellite 125, wherein the shaded area 126 represents the area illuminated by the laser beam whose center is defined by the axis of the propagation path 127, that corresponds to the deconvolution of the hologram in the LCOS-SLM, 128 represents the satellite's travel direction and the angles 9 and p represent respectively the zenith deflection and the azimuthal deflection angle in degrees with respect to the longitudinal axis 125.

The three effects needed to set an optical communication link between a satellite and an Earth station, i.e. tracking and focusing and pointing, can be accomplished by a LCOS-SLM device. In a practical implementation both the satellite and Earth station are involved in a procedure for stablishing the communication link that is novel, as described herein. FIG. 6 presents a typical situation of the satellite (100) over the Earth station (110) situated, by way of example, in Nerpio (Spain), showing the satellite circle of visibility (120). the x orthonormal axis (122) and the corresponding y axis (124) of the satellite's LCOS-SLM field of view, the shaded area (126) representing the area illuminated by the laser beam (127) that corresponds to the deconvolution of the hologram in the LCOS-SLM, and the direction of travel of said satellite (128).

Figure 7:
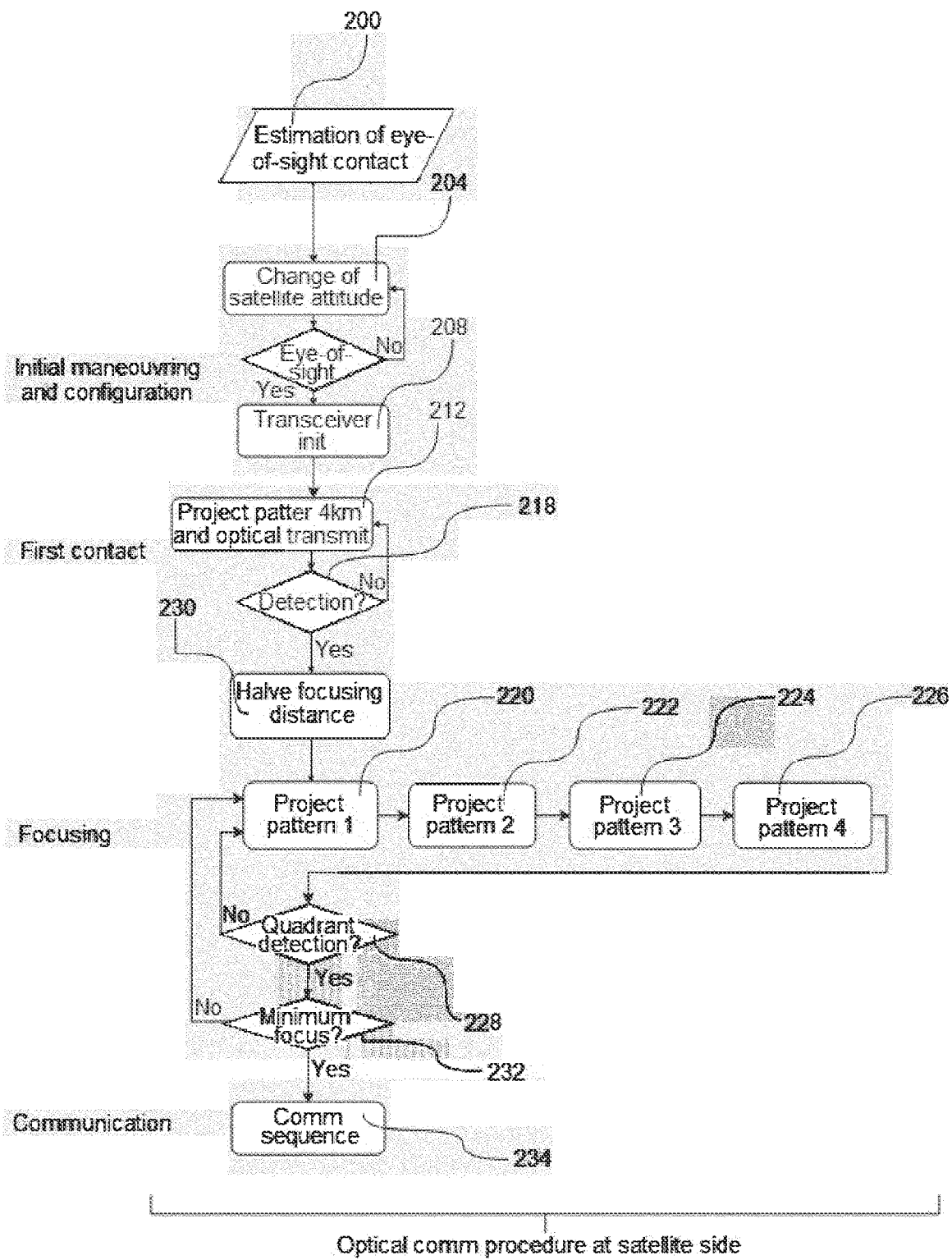
FIG. 7. Optical communication transmitter and receiving station alignment for first coarse contact, pointing refinement and start of communication procedure flow diagram for a method according to the invention exemplified using A. a satellite as said optical communication transmitter and B. an Earth station as said receiving station.

The method and system for transmitting information from an optical communication transmitter (100) to a receiving station (110) via a laser beam (18) and for alignment of said laser beam emitted from said optical communication transmitter with said receiving station (note that said alignment involves transmitting information as per said method and system) involves establishment of an optical communication link as disclosed in FIG. 7. This occurs from the perspective of the optical communication transmitter (satellite, see FIG. 7A) and the receiving station (Earth station, see FIG. 7B). Both the satellite and Earth station computers have a model of the satellite orbit, in the form of TLE elements that are propagated using an algorithm based on SPG4, and its vector with respect to the Earth station as a reference system. and therefore are able to foresee the precise timing for visual passages (i.e. showing the satellite circle of visibility) of the satellite over the Earth station [see FIG. 7A (box 200) and FIG. 7B (box 202). respectively]. Prior to eye-of-sight contact between the satellite and Earth station:

The satellite's on-board computer (microprocessor) commands the satellite's attitude system to maneuver using reaction wheels and magnetorquer and perform a coarse pointing toward the Earth station (box 204 of FIG. 7A).

The earth station computer commands the aft-azimuthal mount to aim the telescope to the satellite's location on the sky (box 206 of FIG. 7B) and starts the operation of the sensing photodiode and associated electronics (box 210 of FIG. 7B).

When the satellite calculates that has direct eye-of-sight to the Earth station starts the laser emitter (box 208) and adjust a centered hologram to cover an Earth spot (square area of the surface of the Earth) having sides of approximately 4 km in length over the surface of the Earth while emitting a data packet (box 212 of FIG. 7A) to denote detection. The protocol for the codification of the data packet is optical on-off keying with pulse position modulation for the physical layer. The link layer is build using the CCSDS protocol and the detection key is included in the packet data field of the protocol.

The 4 km initial spot size is being calculated to account for the inexactitude of orbit determination given by the SPG4 algorithm, which according to data provided by the constellation operated by the company Planet (publicly available in the firm's webpage) accounts for a maximum of 2 km. Upon sensing the illumination by the Earth station photodiode detector (box 214 of FIG. 7B) and identifying the data packet, the Earth station emits an acknowledgement data packet using the RF radio to the satellite to indicate that first contact has been established (box 216 of FIG. 7B).

Figure 8:
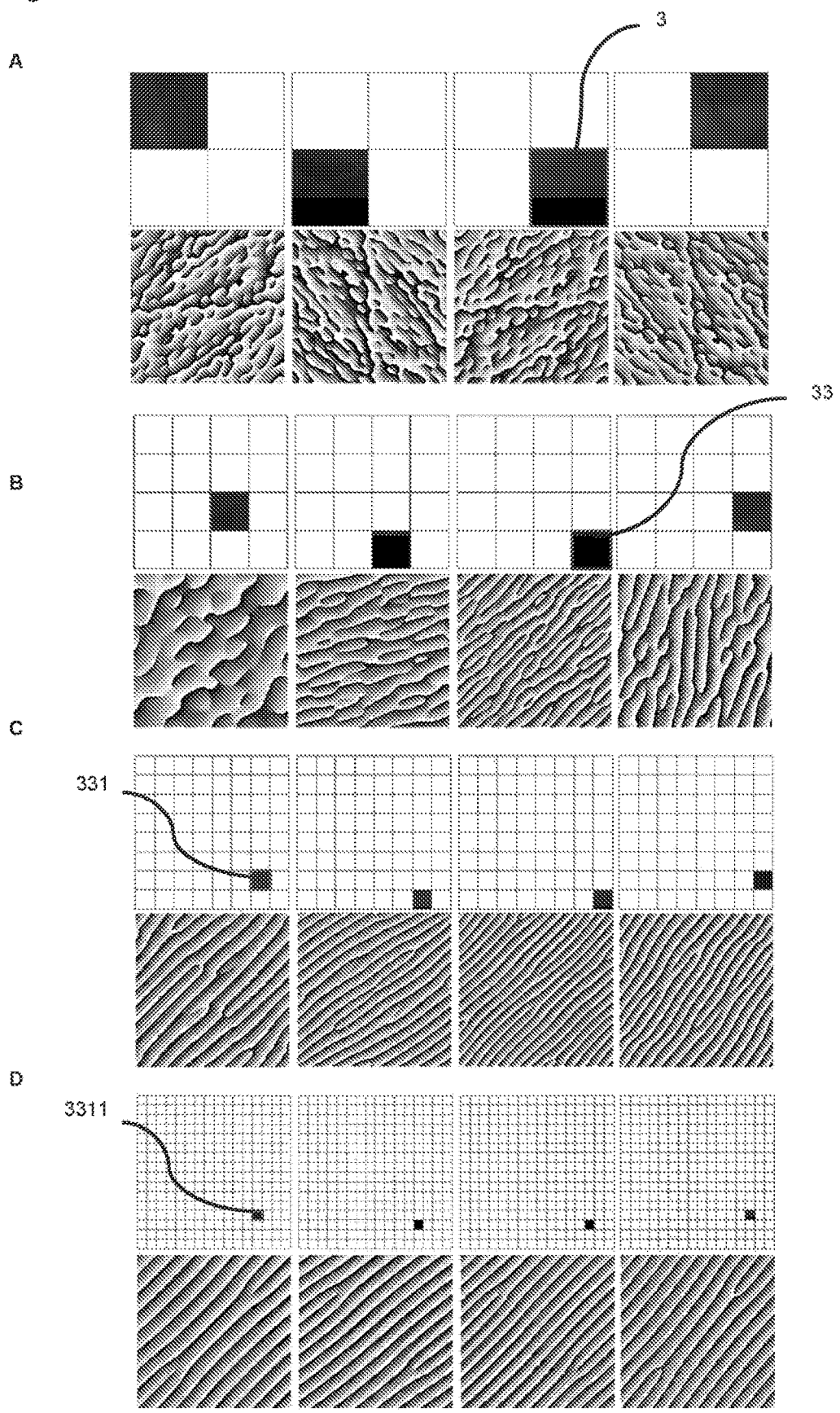
FIG. 8. The holograms of a series of pointing diffraction masks which are projected on the surface of the SLM comprised in the optical communication transmitter (e.g. satellite) as the location or the receiving station (e.g. Earth station) is determined which ends up with the pointing of the laser light within π/9500 radians of the receiving station, thus resulting in a communication link therebetween having maximum efficiency because all available light is concentrated over an small area (a square plane perpendicular to the longitudinal axis of the projected laser beam in which said receiving station is located, having sides of typically 100 to 200 m in length). The outer square of each grid represents the total area that may be illuminated by the laser once reflected and diffracted by the SLM and the dark square within it represents the area actually illuminated by the laser after being reflected and diffracted by the pointing diffraction mask immediately below it. A. Represents the four quadrants that are illuminated (in this case, in an anticlockwise fashion starting from the upper left-hand quadrant) at the beginning of the pointing method using the corresponding holograms generated in each pointing diffraction mask over each interval. After projecting over each square for a period ranging from 1 ms to 200 ms, and receiving feedback from the receiving station, the optical communication transmitter determines that the receiving station resides in the square number 3 (bottom right). B. In a subsequent iteration, the microprocessor of the optical emitter then recalculates the diffraction patterns and generates four diffraction masks to successively illuminate the four quadrants within square number 3 using the corresponding holograms generated in each pointing diffraction mask over each interval. By receiving feedback from the receiving station, the optical emitter microprocessor determines that the receiving station is located within the square 33 (bottom right of square 3). C. The procedure then is repeated with this square 33 which determines that the receiving station is located within the square 331 (top left of square 33). D. By repeating the procedure (at least) one more time in this manner, the laser points on the small square 3311 (top left of square 331) (or a square therewithin). At this point the communication procedure starts by switching the laser at a speed from 1 Mbps to 100 Mbps. Note that tracking diffraction masks have to be added to the diffraction masks (using Fourier transform) to take into account the relative movement of the optical communication transmitter with respect to the receiving station by making rotations to compensate for this movement.

When the satellite receives the acknowledgement data package (box 218 of FIG. 7A), it halves the length of said square area (to 2000 m) over which the laser beam is projected on the Earth by changing the holographic pattern displayed in the SLM and starts repetitively displaying a sequence of holographic patterns [boxes 220, 222, 224 and 226 of FIG. 7A correspond with the holographic patterns shown in FIG. 8A (a), (b), (c) and (d), respectively]. in the SLM of the emitter that corresponds to the projection on the surface of the Earth of a square half the size of the previous one centered on the first, second, third and fourth quadrants [FIG. 8B (a). (b). (c) and (d). respectively] every 100 ms while emitting a labeled data packet stamped with the GPS time signal. In FIG. 8A, the axis 90 and the square 91 are depicted for clarification purposes but are not included in the holograms.

The Earth station will, via UHF, acknowledge the reception of data packages (boxes 214 and 218 of FIG. 7B) stamped with the GPS time signal, which will indicate the quadrant where the Earth station is located and then halving the uncertainty on the position of the satellite with respect to the Earth station. The sequence of boxes 220, 222, 224 and 226 in FIG. 7A has to be combined with the deflection of the laser beam every 100 ms following the procedure described in FIG. 3 to compensate for the speed of its satellite along its orbit.

The halving of the projected square size (box 230 of FIG. 7A) is to be repeated for sizes 1000 m, 500 m, and 200 m;

When this last size is reached (box 232 of FIG. 7A). the Earth station is centred within the laser beam and the communication may start by transferring data at 100 Mbps from the satellite to the Earth station using the free space optical link. Further centring at this point may be made by sensing the differential illumination as detected by the array of four diodes within the G6849 photodiode used in the Earth station.

FIG. 9 represents the holograms projected on the surface of the SLM as the communication is established and is ongoing. Once the optical communication transmitter (e.g. satellite) is focused, a square having sides of 200 m in length is illuminated that corresponds to an angle of $\pi/9500$ radians as seen from the satellite. As a satellite at an orbit 600 km in altitude is moving at 7.6 km·s$^{-1}$, or equivalently at 0.7·s$^{-1}$ (approximately $\pi/250$ radians per second) as seen from the receiving station (e.g. Earth station) in topocentric coordinates, the hologram displayed in the diffractive element will need to be updated every t=27 ms, i.e. the refresh frequency of the tracking mask will need to be at least 9500/250 Hz. In FIG. 9 the holograms corresponding to the tracking of the receiving station (in this embodiment, an Earth station) once it has been located are represented, which compensate for the relative movement of the optical communication transmitter (in this embodiment, a satellite) over its orbit with respect to the stationary earth station by assuming that this displacement is made in a direction that coincides with the horizontal coordinate of the diffractive element. A. (a) through (e) indicate the quadrant (in this embodiment, over the surface of the Earth) being illuminated while B (a) through (e) respectively show the hologram projected on the surface of the diffractive element to achieve this. In particular. (a) corresponds to the quadrant illuminated by the respective hologram once the Earth station is located and the laser is focused to an angle of $\pi/9500$ radians; (b) corresponds to the quadrant illuminated by the respective hologram projected in the LCOS when the satellite has moved an angle of $\pi/9500$ radians with respect to the location of the Earth station in (a); (c) corresponds to the quadrant illuminated by the respective hologram projected in the LCOS when the satellite has moved an angle of $2\cdot\pi/9500$ radians with respect to the location of the Earth station in (a); (d) corresponds to the quadrant illuminated by the respective hologram projected in the LCOS when the satellite has moved an angle of $3\cdot\pi/9500$ radians with respect to the location of the Earth station in (a); and (e) corresponds to the quadrant illuminated by the respective hologram projected in the LCOS when the satellite has moved an angle of $4\cdot\pi/9500$ radians with respect to the location of the Earth station in (a).

As a final aspect of this exemplified embodiment of the present invention, the establishment of the communication was used both by the satellite and the Earth station to refine the TLE data to make the calculations for the next passage and reduce the error in estimating the position of each. For this purpose, the Earth station and the satellite use software produced from the ELFIND, SATFIT, ELCORD and DPFIT source codes available at http://sat.belastro.net/satelliteorbitdetermination.com/.

The invention claimed is:

1. Method for transmitting information from an optical communication transmitter (100) to a receiving station (110) via a laser beam (18) and for alignment of said laser beam emitted from said optical communication transmitter with said receiving station, characterised in that:

said optical communication transmitter is displaced relative to said receiving station and comprises a laser (16), a radio receiver (32), a microprocessor (14) and a liquid crystal on silicon spatial light modulator (24) comprising an element for diffracting and reflecting said laser beam, whereby said laser beam is emitted from said laser and is projected over an area by diffraction and reflection using said liquid crystal on silicon spatial light modulator, wherein said laser and said element for diffracting and reflecting said laser beam are controlled by said microprocessor, wherein said laser beam has a longitudinal axis parallel to the propagation path of said laser beam, whereby the displacement of the receiving station relative to said optical communication transmitter is a component of the vector representing the movement of the optical communication transmitter relative to said receiving station, wherein said component is in the plane perpendicular to a line between said receiving station and said optical communication transmitter, said receiving station comprises a photodiode receiver (52) for detecting said transmitted laser beam and a radio transmitter (60), and said method comprises the following steps:

(i) projecting said laser beam in consecutive intervals over an area in which said receiving station is located by diffraction and reflection using said spatial light modulator;

(ii) dividing said projected laser beam into quadrants intersecting at the longitudinal axis of said projected laser beam;

(iii) interrupting the projection of each quadrant of said laser beam during each interval of a set of consecutive intervals by pulsation of said laser beam using amplitude modulation and by distortion of the wavefront of said laser beam using a pointing diffraction mask generated in said element for diffracting and reflecting said laser beam, for each interval of said set, wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency of the pulses of said amplitude-modulated laser beam that are emitted during any given interval are the same for all quadrants over which said laser beam is projected, and wherein the frequency of the pulses of said amplitude-modulated laser beam that are emitted during at least one interval of said set of intervals are different from the frequency of the pulses of said amplitude-modulated laser beam that are emitted during at least one other interval of said set of intervals;

(iv) identifying the quadrant of said projected laser beam which is detected in said photodiode receiver in the receiving station by determining the frequency of the pulses of the subset of the set of intervals over which the quadrant of said laser beam is projected, and communicating this information to said optical communication transmitter via said radio transmitter and said radio receiver;

(v) projecting said laser beam in consecutive intervals over the area which the quadrant of the laser beam identified in step (iv) was projected over by distorting the wavefront of the laser beam emitted from the laser using the pointing diffraction mask generated in said element for diffracting and reflecting said laser beam, which exclusively projected said quadrant of the laser beam in step (iii); and (vi) repeating steps (ii) to (v) at least a further three times or until the angle between the longitudinal axis of said laser beam projected in step (v) and said longitudinal axis of said projected laser beam in step (ii) is less than π/9500 radians, wherein the direction in which the longitudinal axis of said projected laser beam is pointed in steps (i) to (v) is changed every t seconds as a function of the displacement of the optical communication transmitter with respect to the receiving station by distorting the wavefront of the laser beam emitted from the laser using a tracking diffraction mask which is generated in said element for diffracting and reflecting said laser beam, wherein the intervals have a frequency of value r of between 10 and 500 Hz, the pulses have a frequency of value f of between 0.1 kHz and 100 MHz, and t is between 0.001 and 10 seconds, wherein each tracking diffraction mask is used:

(a) alone in step (i) and in the first iteration of step (ii); and
(b) in combination with a pointing diffraction mask in steps (iii) to (v) and in subsequent iterations of step (ii), and wherein:

(c) each tracking diffraction mask is comprised in a holographic greyscale pattern which, when generated in said element for diffracting and reflecting said laser beam, diffracts and reflects the laser beam which is emitted from said laser, and projects the projected laser beam over the area which it was projected using the tracking diffraction mask used immediately prior thereto, (d) each combination of tracking diffraction mask and pointing diffraction mask is comprised in a holographic greyscale pattern which, when generated in said element for diffracting and reflecting said laser beam, diffracts and reflects the laser beam which is emitted from said laser, and projects the projected laser beam either:

over the area which it was projected using the combination of tracking diffraction mask and pointing diffraction mask used immediately prior thereto, when the pointing diffraction masks used in each combination are the same; or over a subset of the area over which it was projected using:
the tracking diffraction mask used prior thereto when said combination is the first combination used after using a tracking mask; or
the combination of tracking diffraction mask and pointing diffraction mask used prior thereto when the pointing diffraction masks used in each combination are different.

2. The method according to claim 1, wherein the step (i) of projecting said laser beam over an area in which said receiving station is located comprises the steps of:

(a) estimating the position of the optical communication transmitter with respect to the receiving station and estimating the position of the receiving station with respect to the optical communication transmitter;

(b) pointing the longitudinal axis of said projected laser beam in a direction A towards the position of the receiving station estimated in step (a) by changing the attitude of the optical communication transmitter using at least one actuator;

(c) pointing said photodiode receiver in a direction B towards the position of the optical communication transmitter estimated in step (a) by changing the azimuth and/or altitude angles of said photodiode receiver, wherein said direction B is perpendicular to the focal plane of said photodiode receiver and parallel to said direction A; and (d) repeating steps (b) and (c) until the laser beam projected in step (b) is detected using said photodiode receiver.

3. The method according to claim 1, wherein the method comprises an additional step (vii) after step (vi) of transmitting further information to said receiving station by controlling the intensity and amplitude modulation of said projected laser beam, wherein the direction in which the longitudinal axis of said projected laser beam is projected is changed by distorting the wavefront of the laser beam emitted from the laser using a tracking diffraction mask in combination with said pointing diffraction mask generated in the last iteration of step (v).

4. The method according to claim 1, wherein the angle over which said laser beam is projected in step (i) is between π/18850 and π/180 radians.

5. The method according to claim 1, wherein each diffraction mask or combination of diffraction masks that is generated in said element for diffracting and reflecting said laser beam distorts the wavefront of the laser beam and projects an image I(x,y) (42) over said area, wherein said element for diffracting and reflecting said laser beam comprises a matrix of pixels, each pixel being defined by an p coordinate and a q coordinate, wherein the pixel (p,q)=(0,0) is the pixel at the centre of said matrix, and wherein said diffraction mask or combination of diffraction masks is comprised in a holographic greyscale pattern which is calculated in a microprocessor and displayed in said element for diffracting and reflecting said laser beam, wherein each pixel (p,q) of said matrix is assigned a level of gray, g'(p,q) between 0 and w calculated according to the following equation:

$$g'(p,q) = (g(p,q) + g\varphi\theta(p,q)) \bmod(w)$$

wherein:

$$g(p, q) = \frac{w}{2 \cdot \pi} \cdot \psi(p, q) \text{ and}$$

$$g_{\varphi\theta}(p, q) = g\theta(p', q')$$

wherein gθ(p', q') is calculated from gθ(p, q) using the following rotation matrix:

$$\begin{pmatrix} p' \\ q' \end{pmatrix} = \begin{pmatrix} \cos(\varphi) & -\sin(\varphi) \\ \sin(\varphi) & \cos(\varphi) \end{pmatrix} \cdot \begin{pmatrix} p \\ q \end{pmatrix}$$

wherein:

$$g_\theta(p, q) = \frac{w}{2 \cdot \pi} \cdot \left[ \left( 2 \cdot \pi \cdot \frac{p}{n} \right) \bmod(2 \cdot \pi) \right]$$

wherein:
p is the abscissa coordinate of pixel (p,q);
q is the ordinate coordinate of pixel (p,q);

w is the gray value that provides 2·π phase modulation in said element for diffracting and reflecting said laser beam;

mod(w) is the module operation over w;

ψ(p, q) is the phase function of the inverse Fourier transform of said image and is calculated according to the following equation:

$$A(p,q)e^{i\cdot\psi(p,q)} = FT^{-1}[I(x,y)]$$

wherein:

$FT^{-1}[I(x,y)]$=inverse Fourier transform of said image

A(p,q)=is the amplitude of the inverse Fourier Transform of said image i=imaginary unit φ is the azimuthal deflection angle in radians with respect to the longitudinal axis;

n is calculated according to the following formula:

$$n = \frac{\lambda}{\sin(\theta) \cdot l}$$

wherein:

λ is the wavelength in metres of the laser beam;

l is the length of one side of the pixel in metres; and

θ is the zenith deflection angle in radians with respect to the longitudinal axis; and mod(2·π) is the module operation over the angular function.

6. The method according to claim 1, wherein in step (iii) any given quadrant of said projected laser beam is exclusively projected over each interval of said subset.

7. The method according to claim 1, wherein steps (iii) and (iv) comprise the following:

(iii) interrupting the projection of each quadrant of said laser beam during each interval of a set of consecutive intervals by pulsation of said laser beam using amplitude modulation and by distortion of the wavefront of said laser beam using a pointing diffraction mask generated in said element for diffracting and reflecting said laser beam, for each interval of said set, wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency and/or duration of the pulses of said amplitude-modulated laser beam that are emitted during any given interval are the same for all quadrants over which said laser beam is projected, and wherein the frequency and/or duration of the pulses of said amplitude-modulated laser beam that are emitted during at least one interval of said set of intervals are different from the frequency and/or duration of the pulses of said amplitude-modulated laser beam that are emitted during at least one other interval of said set of intervals;

(iv) identifying the quadrant of said projected laser beam which is detected in said photodiode receiver in the receiving station by determining the frequency and/or duration of the pulses of the subset of the set of intervals over which the quadrant of said laser beam is projected, and communicating this information to said optical communication transmitter via said radio transmitter and said radio receiver; wherein the intervals have a frequency of value r of between 10 and 500 Hz and a duration of less than or equal to $r^{-1}$, the pulses have a frequency of value f of between 0.1 kHz and 100 MHz and a duration of less than or equal to $f^{-1}$, and t is between $r^{-1}$ and 10.

8. Optical communication device for transmitting information from an optical communication transmitter (100) to a receiving station (110) via a laser beam (18) and for alignment of said laser beam emitted from said optical communication transmitter with said receiving station, characterised in that said device comprises the following components:

a laser (16), a radio receiver (32), a liquid crystal on silicon spatial light modulator (24) comprising an element for diffracting and reflecting said laser beam which is emitted from said laser, and a microprocessor (14), wherein said laser and said element for diffracting and reflecting said laser beam are controlled by said microprocessor, characterised in that said components are arranged to carry out the following steps:

(i) projecting said laser beam in consecutive intervals over an area in which said receiving station is located by diffraction and reflection using said spatial light modulator;

(ii) dividing said projected laser beam into quadrants intersecting at the longitudinal axis of said projected laser beam;

(iii) interrupting the projection of each quadrant of said laser beam during each interval of a set of consecutive intervals by pulsation of said laser beam using amplitude modulation and by distortion of the wavefront of said laser beam using a pointing diffraction mask generated in said element for diffracting and reflecting said laser beam, for each interval of said set, wherein any given quadrant of said projected laser beam is projected over a subset of said set of intervals which is different from the subset of said set of intervals over which other quadrants of said laser beam are projected and wherein said quadrant is exclusively projected over at least one interval of said subset, wherein the frequency of the pulses of said amplitude-modulated laser beam that are emitted during any given interval are the same for all quadrants over which said laser beam is projected, and wherein the frequency of the pulses of said amplitude-modulated laser beam that are emitted during at least one interval of said set of intervals are different from the frequency of the pulses of said amplitude-modulated laser beam that are emitted during at least one other interval of said set of intervals;

(iv) identifying the quadrant of said projected laser beam which is detected in said photodiode receiver in the receiving station by determining the frequency of the pulses of the subset of the set of intervals over which the quadrant of said laser beam is projected, and communicating this information to said optical communication transmitter via said radio transmitter and said radio receiver;

(v) projecting said laser beam in consecutive intervals over the area which the quadrant of the laser beam identified in step (iv) was projected over by distorting the wavefront of the laser beam emitted from the laser using the pointing diffraction mask generated in said element for diffracting and reflecting said laser beam, which exclusively projected said quadrant of the laser beam in step (iii); and (vi) repeating steps (ii) to (v) at least a further three times or until the angle between the longitudinal axis of said laser beam projected in step (v) and said longitudinal axis of said projected laser beam in step (ii) is less than π/9500 radians, wherein the direction in which the longitudinal axis of said projected laser beam is pointed in steps (i) to (v) is changed every t seconds as a function of the displacement of the optical communication transmitter with respect to the receiving station by distorting the wavefront of the laser beam emitted from the laser using a tracking diffraction mask which is generated for diffracting and reflecting said laser beam, whereby the displacement of the receiving station relative to said optical communication transmitter is a component of the vector representing the movement of the optical communication transmitter relative to said receiving station, wherein said component is in the plane perpendicular to a line between said receiving station and said optical communication transmitter, wherein the intervals have a frequency of value r of between 10 and 500 Hz, the pulses have a frequency of value f of between 0.1 kHz and 100 MHz, and t is between 0.001 and 10 seconds, wherein each tracking diffraction mask is used:
(a) alone in step (i) and in the first iteration of step (ii); and
(b) in combination with a pointing diffraction mask in steps (iii) to (v) and in subsequent iterations of step (ii),
and wherein:
(c) each tracking diffraction mask is comprised in a holographic greyscale pattern which, when generated in said element for diffracting and reflecting said laser beam, diffracts and reflects the laser beam which is emitted from said laser, and projects the projected laser beam over the area which it was projected using the tracking diffraction mask used immediately prior thereto,
(d) each combination of tracking diffraction mask and pointing diffraction mask is comprised in a holographic greyscale pattern which, when generated in said element for diffracting and reflecting said laser beam, diffracts and reflects the laser beam which is emitted from said laser, and projects the projected laser beam either:
  over the area which it was projected using the combination of tracking diffraction mask and pointing diffraction mask used immediately prior thereto, when the pointing diffraction masks used in each combination are the same; or
  over a subset of the area over which it was projected using:
    the tracking diffraction mask used prior thereto when said combination is the first combination used after using a tracking mask; or
    the combination of tracking diffraction mask and pointing diffraction mask used prior thereto when the pointing diffraction masks used in each combination are different.

* * * * *